United States Patent [19]
Sharma et al.

[11] Patent Number: 6,162,869
[45] Date of Patent: Dec. 19, 2000

[54] WATERBORNE ACRYLIC POLYMERS CONTAINING POLYMERIC FLUORESCENT COMPOUNDS

[75] Inventors: Mahendra K. Sharma, Kingsport, Tenn.; Richard Hsu-Shien Wang, Parsippany, N.J.; James J. Krutak, Kingsport, Tenn.

[73] Assignee: Eastman Chemical Company, Kingsport, Tenn.

[21] Appl. No.: 09/338,386

[22] Filed: Jun. 22, 1999

[51] Int. Cl.$^7$ ..................................................... C09K 11/06
[52] U.S. Cl. ............... 525/170; 252/301.21; 252/301.35; 524/516
[58] Field of Search ...................................... 525/212, 204, 525/170; 524/521, 516, 513; 252/301.21, 301.35

[56] References Cited

U.S. PATENT DOCUMENTS

| | | |
|---|---|---|
| 2,657,194 | 10/1953 | Butler et al. . |
| 2,657,195 | 10/1953 | Toland et al. . |
| 3,666,680 | 5/1972 | Briggs ...................................... 252/316 |
| 3,709,896 | 1/1973 | Frischkorn et al. . |
| 3,912,697 | 10/1975 | Pacifici . |
| 4,095,939 | 6/1978 | Pacifici et al. . |
| 4,177,347 | 12/1979 | Meyer . |
| 4,803,241 | 2/1989 | Weaver et al. . |
| 4,804,719 | 2/1989 | Weaver et al. . |
| 4,882,412 | 11/1989 | Weaver et al. . |
| 4,978,476 | 12/1990 | Allen et al. . |
| 5,039,782 | 8/1991 | Langer et al. . |
| 5,082,578 | 1/1992 | Langer et al. . |
| 5,292,855 | 3/1994 | Krutak et al. . |
| 5,336,714 | 8/1994 | Krutak et al. . |
| 5,423,432 | 6/1995 | Krutak et al. . |
| 5,538,760 | 7/1996 | Sharma . |
| 5,553,714 | 9/1996 | Cushman et al. . |
| 5,637,637 | 6/1997 | Sharma et al. . |

FOREIGN PATENT DOCUMENTS

| | | |
|---|---|---|
| 413648A1 | 2/1991 | European Pat. Off. . |
| 583888A1 | 2/1994 | European Pat. Off. . |
| 4858/66 | 4/1966 | Germany . |
| WO86/04903 | 8/1986 | WIPO . |
| WO 93/09172 | 5/1993 | WIPO . |
| WO97/15634 | 5/1997 | WIPO . |

*Primary Examiner*—Paul R. Michl
*Attorney, Agent, or Firm*—Rose M. Allen, Esq.; Harry J. Gwinnell, Esq.

[57] ABSTRACT

The present invention provides acrylic polymer-optical brightener compositions. The invention also provides acrylic polymer-optical brightener compositions further comprising near infrared absorbing compounds. The invention also provides processes for making such compositions. Still further, the invention provides methods for detecting and/or separating fluorescing and/or near infrared emitting articles from non-fluorescing and/or non-near infrared emitting articles.

127 Claims, No Drawings

WATERBORNE ACRYLIC POLYMERS CONTAINING POLYMERIC FLUORESCENT COMPOUNDS

FIELD OF THE INVENTION

The present invention pertains to acrylic polymer compositions. In particular, the present invention provides acrylic polymer compositions having an optical brightener agent. The present invention further provides acrylic polymer compositions having optical brightener agents and near infrared absorbing compounds. Still further, the present invention provides acrylic polymer composition having a near infrared absorbing compound. The present invention also provides processes for making the acrylic polymer compositions. Moreover, the present invention provides methods of separating fluorescing and/or near infrared absorbing objects from non-fluorescing and/or near infrared absorbing objects according to the methods described herein.

BACKGROUND OF THE INVENTION

The uses and benefits of acrylic polymer compositions are well known and documented in the literature. Generally, such compositions are desirable because they are water-based and can serve as the carrier for a wide variety of materials, including surface coatings, colorants and other substances.

Similarly, optical brightener agents, e.g., ultraviolet light absorbing ("U.V. absorbing"), compounds copolymerized within a polymer matrix are well known. For example, U.S. Pat. No. 4,882,412 to Weaver et al. discloses a polyester composition useful for molding into articles. In that disclosure, a polyester composition was copolymerized with a residue of a 7-oxy-2H-1-benzopyran-2-one compound or a 7-oxy-2H-1-benzopyran-2-imine compound, each of which are U.V. absorbing compounds.

U.S. Pat. No. 4,803,241 to Weaver et al. discloses a polymer composition comprised of a polyester or polycarbonate material copolymerized with a styrylbenzyoxazole compound.

U.S. Pat. Nos. 4,095,939 to Pacifici et al.; 2,657,188 to Butler et al.; 3,709,896 to Frischkorn et al.; and 2,657,195 to Toland et al. disclose the copolymerization of a U.V. absorbing compound with a polyester.

U.S. Pat. No. 4,177,347 to Meyer discloses a process for the preparation of distylbenzyl-oxadiazoles and the use thereof for optically brightening certain organic materials. The distilbenzyl-oxadiazoles have a carboxyl group and sulfonate group.

U.S. Pat Nos. 5,082,578 and 5,039,782 to Langer et al. disclose copolymeric whitening agents. The copolymers have a fluorescent portion and a hydrophilic portion. Hydrophilic monomers that are useful to prepare the copolymers include alkylene glycols, such as ethylene glycol, propylene glycol and butylene glycol. Other disclosed hydrophilic monomers include sugars, such as glucose, sucrose, sorbitol or glycerol.

While each of the above references discloses the incorporation of an optical brightener agent into a polymer, none of the above references disclose the incorporation of a sulfonate-containing monomer and an optical brighter agent comprising at least one polyester reactive group into a polymeric material. Nor is the incorporation of such materials into an acrylic polymer composition disclosed in any of the above references.

The incorporation of near infrared absorbing compounds into polymeric materials has also been disclosed. For example, U.S. Pat. Nos. 5,292,855; 5,336,714; and 5,423,432, each to Krutak et al., disclose water dissipatible, sulfo-containing polyesters and polyamides having copolymerized near-infrared absorbing compounds. However, when utilized in acrylic polymer compositions as contemplated by Krutak's disclosures, the copolymerized near-infrared compounds formed highly unstable compositions.

In light of the above, it would be desirable to obtain acrylic polymer compositions that incorporate polymeric materials having optical brightener agents, with or without near infrared absorbing agents. It would also be desirable to develop processes that provide stable acrylic polymer compositions that have optical brightener agents, near-infrared absorbing agents or both. Further, it would be desirable to develop methods of detecting and/or separating objects contacted with the acrylic polymer-optical brightener compositions that have optical brightener agents, near infrared absorbing agents or both.

SUMMARY OF THE INVENTION

In one aspect, the invention provides an acrylic polymer composition having an optical brightener agent wherein the composition comprises:
  a) a first polymer comprising repeat units of a monomer having the formula $CH_2=CR^A-C(O)OR^B$, wherein $R^A$ and $R^B$ are each, independently, a $C_1$ to $C_8$ straight or branched alkyl group and wherein $R^A$ can be hydrogen; and
  b) a polymeric fluorescent compound, wherein the polymeric fluorescent compound comprises repeat units of residues of:
    i) a monomer comprising a dicarboxylic acid or ester;
    ii) a monomer comprising a diol, a diamine or a mixture thereof;
    iii) a monomer comprising at least one sulfonate group and at least one polyester reactive group; and
    iv) a monomer comprising an optical brightener agent having at least one polyester reactive group.

Still further, the invention provides an acrylic polymer composition having a near infrared absorbing compound wherein the composition comprises:
  a) a first polymer comprising repeat units of a monomer having the formula $CH_2=CR^A-C(O)OR^B$, wherein $R^A$ and $R^B$ are each, independently, a $C_1$ to $C_8$ straight or branched alkyl group and wherein $R^A$ can be hydrogen; and
  b) a polymeric near infrared absorbing compound, wherein the polymeric near infrared absorbing compound comprises repeat units of residues of:
    i) a monomer comprising a dicarboxylic acid or ester;
    ii) a monomer comprising a diol, a diamine or a mixture thereof,
    iii) a monomer comprising at least one sulfonate group and at least one polyester reactive group; and
    iv) a monomer comprising an near infrared absorbing compound having at least one polyester reactive group,
wherein the acrylic polymer composition having a near infrared absorbing agent comprises acrylic polymer particles and the polymeric near infrared absorbing compound is incorporated within the acrylic polymer particles at or near the surface of the acrylic polymer particles.

In a further aspect, the invention provides a process for preparing a composition comprising a waterborne acrylic polymer and a polymeric fluorescent compound wherein the process comprises:

a) dispersing about 0.1 to about 50.0% by weight of a polymeric fluorescent compound;

b) mixing the dispersion with at least one acrylic monomer having the formula $CH_2=CR^A-C(O)OR^B$, wherein $R^A$ and $R^B$ are each, independently, a $C_1$ to $C_8$ straight or branched alkyl group and wherein $R^A$ can be hydrogen; and c) polymerizing the acrylic monomer.

In yet a further aspect, the invention provides a process for preparing a composition comprising a waterborne acrylic polymer and a polymeric near infrared absorbing agent wherein the process comprises:

a) dispersing about 0.1 to about 50.0% by weight of a polymeric near infrared absorbing agent;

b) mixing the dispersion with at least one acrylic monomer having the formula $CH_2=CR^A-C(O)OR^B$, wherein $R^A$ and $R^B$ are each, independently, $C_1$ to $C_8$ straight or branched alkyl groups and wherein $R^A$ can be hydrogen; and c) polymerizing the acrylic monomer wherein the composition comprises acrylic polymer particles and the polymeric near infrared absorbing compound is located within the acrylic polymer particles at or near the surface of the acrylic polymer particles.

Additional advantages of the invention will be set forth in part in the description that follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION OF THE INVENTION

The present invention may be understood more readily by reference to the following detailed description of preferred embodiments of the invention and the Examples included therein.

Before the present compositions, processes and methods are disclosed and described, it is to be understood that this invention is not limited to the specific synthetic methods or to the particular formulations disclosed herein, and, as such may vary. Further, it is also to be understood that the terminology used herein is for the purpose of describing particular embodiments only and is not intended to be limiting.

In the specification and in the claims which follow, reference will be made to a number of terms which shall be defined to have the meanings set out below.

The singular forms "a," "an" and "the" include plural referents unless the context clearly dictates otherwise.

"Optional" or "optionally" means that the subsequently described event or circumstance may or may not occur, and that the description includes instances where said event or circumstance occurs and instances where it does not.

Ranges are often expressed herein as from about one particular value, and/or to about another particular value. When such a range is expressed, it is to be understood that another embodiment is from the one particular value and/or to the other particular value. Similarly, when values are expressed as approximations, by use of the antecedent "about," it will be understood that the particular value is another embodiment.

The term "alkyl" is used to designate a straight or branched chain substituted or unsubstituted hydrocarbon radical containing from 1 to 12 carbon atoms.

With the terms "lower alkyl," "lower alkoxy," "lower alkylthio," "lower alkoxycarbonyl," "lower alkanoyl," and "lower alkanoyloxy," the alkyl portion contains from 1 to 6 carbon atoms and may be straight or branched chain and substituted or unsubstituted.

The term "cycloalkyl" is used to represent a cyclic aliphatic hydrocarbon radical containing from 3 to 8 carbon atoms, preferably from 5 to 7 carbon atoms.

The "alkyl" and "lower alkyl" groups may be substituted with one or more groups selected from hydroxy, halogen, carboxy, cyano, $C_1-C_4$ alkoxy, aryl, $C_1-C_4$-alkylthio, arylthio, aryloxy, $C_1-C_4$-alkoxycarbonyl or $C_1-C_4$-alkanyloxy.

The term "aryl" includes carbocyclic aromatic radicals containing from 6 to 18 carbon atoms, preferably phenyl and naphthyl, optionally substituted with one or more substituents selected from lower alkyl, lower alkoxy, halogen, lower alkylthio, N(lower alkyl)$_2$, trifluoromethyl, carboxy, lower alkoxycarbonyl, hydroxy, lower alkylsulfonylamino, arylsulfonylamino, cycloalkylsulfonylamino, lower alkanoyloxy, cyano, phenyl, phenylthio and phenoxy.

The term "heteroaryl" is used to represent mono- or bicyclic heteroaromatic radicals containing at least one heteroatom selected from oxygen, sulfur and nitrogen or a combination of these atoms. Examples of suitable heteroaryl groups include, but are not limited to, thiazolyl, benzothiazolyl, pyrazolyl, pyrrolyl, thienyl, furyl, thiadiazolyl, oxadiazolyl, benzoxazolyl, benzimidazolyl, pyridyl, pyrimidinyl and triazolyl. These heteroaryl radicals may contain the same substituents listed above as possible substituents for the aryl radicals. The term triazolyl also includes the structure shown below and isomers thereof:

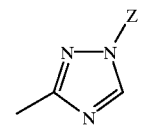

wherein Z is hydrogen or selected from lower alkyl or lower alkyl substituted with one or two groups selected from hydroxy, halogen, carboxy, lower alkoxy, aryl, cyano, cycloalkyl, lower alkanoyloxy or lower alkoxycarbonyl.

The terms "alkenyl" and "alkynyl" are used to denote a substituted or unsubstituted hydrocarbon moiety having from 3 to 8 carbon atoms and containing at least one carbon-carbon double bond and one carbon-carbon triple bond, respectively.

The term "halogen" is used to include bromine, chlorine, fluorine and iodine.

The term "substituted alkyl" is used to denote a straight or branched chain hydrocarbon radical containing from 1 to 12 carbon atoms and substituted with at least one group, preferably selected from hydroxy, halogen, carboxy, cyano, $C_1-C_4$ alkoxy, aryl, $C_1-C_4$ alkylthio, arylthio, aryloxy, $C_1-C_4$ alkoxycarbonyl, $C_1-C_4$ alkanoyloxy, or a combination thereof.

The term "substituted carbamoyl" is used to denote a radical having the formula —C(O)NRR', wherein R and R' are selected from unsubstituted or substituted alkyl, alkenyl, alkynyl, cycloalkyl, aryl, or heteroaryl.

The term "substituted sulfamoyl" is used to denote a radical having the formula —SO$_2$NRR', wherein R and R' are as defined above.

The term "alkylene" refers to a divalent $C_1$–$C_{12}$ aliphatic hydrocarbon moiety, either straight or branched-chain, and either unsubstituted or substituted with one or more groups selected from lower alkoxy, halogen, aryl, or aryloxy.

The term "acyl" refers to a group of the formula R"C(=O)O—, wherein R" is preferably a $C_1$–$C_{10}$ alkyl moiety. The term "alkyl sulfonyl" refers to a group of the formula R"SO$_2$—, wherein R" is as defined for acyl.

The term "sulfonate group" is defined as —SO$_3$Y, wherein Y is hydrogen, alkyl or aryl as defined above, or a metal ion.

The phrase "polyester reactive group" is defined as any functional group capable of reacting with an alcohol, an amine, a carboxylic acid, a carboxylic anhydride, a carboxylic halide, a carbamide, or a carboxylic ester.

The phrase "near-infrared" is defined as the light absorption region of the electromagnetic spectrum with wavelengths of from about 700 to about 1100 nm. The term "ultraviolet" is defined as the light absorption region of the electromagnetic spectrum having a wavelength of from about 150 to about 400 nm. The term "visible" is defined as the light absorption region of the electromagnetic spectrum with a wavelength of from about 400 to about 700 nm. The blue emitting region of the electromagnetic spectrum is defined as the light-emitting region having a wavelength of from about 400 to about 500 nm.

The term "optical brightener agent" is a compound that can absorb light in the ultraviolet range, and subsequently emits blue light in the visible region. Further, as used herein, the term "optical brightener agent" also denotes fluorophoric compound. The term "near infrared absorbing compound" denotes a compound that absorbs light in the near infrared region.

In one embodiment, the invention provides an acrylic polymer composition having an optical brightener agent wherein the composition comprises: a) a first polymer comprising repeat units of a monomer having the formula $CH_2=CR^A$—$C(O)OR^B$, wherein $R^A$ and $R^B$ are each, independently, a $C_1$ to $C_8$ straight or branched alkyl group and wherein $R^A$ can be hydrogen; and b) a polymeric fluorescent compound wherein the polymeric fluorescent compound comprises repeat units of residues of: i) a monomer comprising a dicarboxylic acid or ester; ii) a monomer comprising a diol, a diamine or a mixture thereof; iii) a monomer comprising at least one sulfonate group and at least one polyester reactive group; and iv) a monomer comprising an optical brightener agent having at least one polyester reactive group.

In a further embodiment, the monomers comprising the first polymer are monoethylenically unsaturated with the chemical formula of $CH_2=CR^A$—$C(O)O$—$R^B$, wherein $R^A$ and $R^B$ are as defined previously. In particularly preferred embodiments of the invention herein, the first polymer comprises repeat units of a monomer selected from the group consisting of: styrene; -methyl styrene; methyl acrylate; methylmethacrylate; ethyl acrylate; butylacrylate; butylmethacrylate; ethylhexylacrylate; 2-hydroxyethylacrylate; hydroxyethylmethacrylate; acrylic acid; acrylamide; maleic anhydride; acrylonitrile and any derivatives thereof. In a further particularly preferred embodiment, the monoethylenically unsaturated monomer is methylmethacrylate.

The particle size of the particles of the acrylic polymer-optical brightener compositions is preferably below about 2000 nm, more preferably, below about 1000 nm, even more preferably from about 20 to about 700 nm, and, even more preferably from about 60 to about 250 nm. The temperature of the reaction is preferably from about 20 to about 100° C., more preferably from about 60 to about 90° C.

The acrylic polymer aspect of the invention may be prepared by any conventional means known in the art. The monomers that are used to form the acrylic polymer aspect of the acrylic polymer-optical brightener compositions may be broadly characterized as ethylenically unsaturated monomers. These include, but are not limited to, non-acid vinyl monomers, acid vinyl monomers and/or mixtures thereof. The acrylic polymer aspect of the invention may be copolymers of non-acid vinyl monomers and acid monomers, mixtures thereof and their derivatives. The acrylic polymer aspect of the invention may also comprise homopolymers of ethylenically unsaturated monomers.

The acrylic polymer-optical brightener compositions of this invention are preferably prepared by emulsion polymerization. The solids content of the emulsion polymerization reaction is preferably from about 5 to about 60% by weight, more preferably, from about 10 to about 60% by weight, as measured by the total volume of the reaction. In further preferred embodiments, the solids content of the reaction is from about 20 to about 60% by weight, still preferably, the solids content of the reaction is from about 30 to about 60% by weight, and, still preferably, the solids content is from about 40 to about 60% by weight and, still further preferably, the solids content of the reaction is from about 50 to about 60% by weight, as measured by the total volume of the reaction.

When the acrylic polymer is prepared i.e., the monomer polymerized, in the presence of the polymeric fluorescent compound according to the processes of the invention, the polymeric fluorescent compound may or may not participate in the polymerization reaction to become chemically attached to the acrylic polymer to become part of the polymer backbone. In one particularly preferred embodiment of the invention herein, the polymeric fluorescent compound does not participate in the emulsion polymerization reaction. Rather, the polymeric fluorescent compound is predominately incorporated into acrylic polymer particles via physical entanglement.

In a preferred embodiment, the invention provides an acrylic polymer composition having an optical brightener agent wherein a polymeric fluorescent compound is incorporated in acrylic polymer particles that comprise the acrylic polymer compositions. Preferably, the polymeric fluorescent compound is located within the acrylic polymer particle at or near the surface of the acrylic polymer particle so as to provide a stabilizing effect to the particle. That is, when the polymeric fluorescent compound is located at or near the surface of the acrylic polymer particle, polyester chain and the sulfonate group within the compound provides both steric and/or electrostatic stabilizing effects that markedly and surprisingly increase the stability of the resulting acrylic polymer compositions. Such surprising improvements in stability are made possible through the processes of the present invention, as set out in more detail below.

In a further embodiment of the invention herein, the compositions further comprise a water soluble or dispersible surfactant. Preferably, the surfactant has a hydrophilic-lipophilic balance of greater than or equal to about 7.0. Further preferably, the surfactant will have a molecular weight of less than or equal to about 1000.

Preferably, the surfactant is present in the amount of about 0.01% to about 5.0 wt. % based upon the total weight of the acrylic polymer-optical brightener composition. In a particularly preferred embodiment, the surfactant is present in the amount of about 0.05% to about 1.0 wt. % based upon the total weight of the acrylic polymer-optical brightener composition. Preferably, the compositions should comprise small acrylic polymer particles with minimum incorporation of surfactant.

One of skill in the art would recognize that the type and amount of surfactant used in the emulsion polymerization depends on the monomer combinations and the polymerization conditions. Surfactants used in the emulsion polymerization may be anionic, cationic, or nonionic surfactants. Anionic surfactants that may be used in the invention include surfactants such as alkali metal or ammonium salts of alkyl, aryl or alkylaryl sulfonates; sulfates; phosphates or a mixture thereof. Further suitable nonionic surfactants include, but are not limited to, alkyl and alkylaryl polydiol ethers, such as ethoxylation products of lauryl, oleyl stearyl alcohols; and alkyl phenol glycol ethers, including but not limited to, ethoxylation products of octyl or nonylphenol. Further, suitable surfactants may be found in *McCutcheon's Volume I. Emulsifiers and Detergents* 1996 *North American Edition,* MC Publishing Co., Glen Rock, N.J., 1996.

Particularly preferred surfactants for the present invention include compounds selected from the group consisting of ionic and nonionic surfactants; alkyl polyglycol ethers; alkyl phenyl polyglycol ethers; alkali metal ammonium salts of alkyl, aryl and alkylauryl sulfonates; sulfates or phosphates; and sulfosuccinate salts. Further preferred surfactants include sodium lauryl sulfate; sodium octylphenol glycolether sulfate; sodium dodecylbenzene sulfonate; sodium lauryldiglycol sulfate; and ammonium tritertiarybutyl phenol and penta- and octa-glycol sulfonates; sulfosuccinate salts such as disodium ethoxylated nonylphenol half ester of sulfosuccinic acid; disodium n-octyldecyl sulfosuccinate; sodium dioctyl sulfosuccinate; and the like.

The surfactant may or may not be reactive in the emulsion polymerization. In one embodiment, useful surfactants are the sulfate/sulfonate salts of nonyl phenol and alkyl alcohol ethoxylates. Preferred surfactants include, but are not limited to, polymerizable or nonpolymerizable alkyl ethoxylate sulfates; alkyl phenol ethoxylate sulfates; alkyl ethoxylates; alkyl phenol ethoxylates; or a mixture thereof.

In a further preferred embodiment, the surfactant is a surface active monomer, for example, a reactive anionic or nonionic surfactant having styrene or allyl groups. Examples of such materials include surface active monomers sold by PPG Industries, Inc., under the trademarks SAM181, SAM99, SAM184, and SAM211, each of which are anionic sulfates or sulfonates and SAM185, SAM 186 and SAM187 which are nonionic sulfates or sulfonates. Other reactive surfactants that may be utilized in the compositions of this invention include materials sold by Daiichi Kogyo Seiyaku under the trademark AQUARON. Examples of AQUARON surfactants include a compound of the formula:

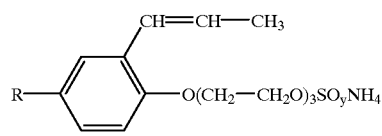

wherein R is a $C_1$–$C_{12}$ alkyl group and y is an integer of from 1 to 5. Other reactive surfactants that may be utilized in the compositions of this invention include sodium alkyl and allyl sulfosuccinate products sold by Henkel, under the trademark TREMLF-40.

Preferably, the compositions of the present invention comprise an initiator. The initiator may preferably comprise ammonium persulfate; potassium persulfate; hydrogen peroxide; dibenzoyl peroxide; lauryl peroxide; ditertiary butyl peroxide; 2,2'-azobisisobutyronitrile; t-butylperoxide; t-butyl hydroperoxide; benzoyl peroxide; sodium formaldehyde sulfoxylate or a mixture thereof. In a particularly preferred embodiment of the compositions of the present invention, the initiator comprises ammonium persulfate.

The compositions of the present invention preferably comprise water in the range of about 30 to about 90% by weight of the acrylic polymer-optical brightener compositions. Further preferably, the compositions comprise water in the range of about 40 to about 90% by weight of the acrylic polymer-optical brightener compositions. Still preferably, the compositions comprise water in the range of about 50 to about 90% by weight of the acrylic polymer-optical brightener compositions. In a further preferable composition, water is present in the amount of about 60 to about 90% by weight of the acrylic polymer-optical brightener compositions. In yet further preferred embodiments, water is present in the amount of from about 70 to about 90% by weight of the acrylic polymer-optical brightener compositions. Still further, it is preferred that water is present in the amount of from about 80 to about 90% by weight of the acrylic polymer-optical brightener compositions.

In further preferred embodiments of the invention herein, the polymeric fluorescent compound comprises repeat units of residues of dimethyl isophthalate; dimethyl 5-sodiosulfoisophthalate; diethylene glycol; 1,4-cyclohexanedimethanol; 2,5-bis-(4'-carbomethoxystyrylphenyl)-1,2,4-oxadiazole; or a mixture thereof.

The polymeric fluorescent compound preferably further comprises repeat units of residues of dicarboxylic acids or esters and diols. The dicarboxylic acid component of the polymeric fluorescent compound may include aromatic dicarboxylic acids, preferably having from about 8 to about 14 carbon atoms; aliphatic dicarboxylic acids preferably having from about 4 to about 12 carbon atoms; or cycloalphatic dicarboxylic acids preferably having from about 8 to about 12 carbon atoms. Specific examples of dicarboxylic acids that may be utilized in the present invention include succinic acid; glutaric acid; adipic acid; azelaic acid; sebacic acid; 1,4-cyclohexanedicarboxylic acid; phthalic acid; terephthalic acid; isophthalic acid; 2,6-naphthalenedicarboxylic acid; dimethyl terephthalate; cyclohexanediacetic acid; diphenyl-4,4'-dicarboxylic acid; fumaric acid; 2,7-naphthalene di-carboxylic acid; resorcinoldiacetic acid; diglycolic acid; 4,4'-oxybis(benzoic) acid; biphenyldicarboxylic acid; 1,12-dodecanedicarboxylic acid; 4,4'-sulfonyldibenzoic acid; 4,4'-methylenedibenzoic acid; trans-4,4'stilbenedicarboxylic acid or a mixture thereof. In a particularly preferred embodiment of the invention herein, the dicarboxylic acid comprises terephthalic acid.

In further preferred embodiments of the invention herein, the dicarboxylic ester comprises dimethyl ester of 1,4-cyclohexanedicarboxylic acid; dimethylester of isophthalic acid; or a mixture thereof. The amount of dicarboxylic acid or ester is preferably from about 35 to about 65 parts by weight of the total weight of the polymeric fluorescent compound. Further preferably, the dicarboxylic acid is present at from about 45 to about 65 parts by weight wherein the sum of components i) to iv) is equal to 100 parts. Still preferably, the dicarboxylic acid is present at from about 55 to about 60 parts by weight of the total weight of the polymeric fluorescent compound wherein the sum of components i) to iv) is equal to 100 parts. As used herein, it should be understood that use of the corresponding acid anhydrides, esters, and acid chlorides of these acids is included in the term "dicarboxylic acid."

Further preferably, the polymeric fluorescent compound comprises repeat units of residues of a monomer comprising a diol. The diol component of the polymeric fluorescent compound may include cycloaliphatic diols preferably having from about 6 to about 20 carbon atoms or aliphatic diols preferably having from about 3 to about 20 carbon atoms. Examples of preferred diols include ethylene glycol; diethylene glycol; propylene glycol; 1,3-propanediol; triethylene glycol; 2,4-dimethyl-2-ethylhexane-1,3-diol; 2,2,-dimethyl-1,3-propanediol; 1,3-butanediol; 1,4-butanediol; 1,5-pentanediol; 1,6-hexanediol; thiodiethanol; 2-methyl-propane-1,3-diol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol; 2-methyl-1,3-propanediol; 1,10-decanediol; 3-methyl-2,4-pentanediol; 2-methyl-1,4-pentanediol; 2,2,4-trimethyl-1,3-pentane-diol; 2-ethyl-1,3-hexanediol; 2,2-diethyl-1,3-propane-diol; 1,3-hexanediol; 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxy phenyl)-propane; 2,2-bis-(4-hydroxy-propoxyphenyl)-propane or a mixture thereof. In a particularly preferred embodiment of the invention herein, the diol is present in the polymeric fluorescent compound in the amount of about 25 to about 50 parts by weight of the polymeric fluorescent compound wherein the sum of components i) to iv) is equal to 100 parts. Still preferably, the diol is present in the amount of from about 35 to about 50 parts by weight of the polymeric fluorescent compound wherein the sum of components i) to iv) is equal to 100 parts. Further preferably, the diol is present in the amount of from about 45 to about 50 parts by weight of the polymeric fluorescent compound wherein the sum of components i) to iv) is equal to 100 parts.

Further preferably, the polymeric fluorescent compound may comprise repeat units of residues of a monomer comprising a diamine. In further preferred embodiments, the diamine can also be used alone or in combination with the diol. In one embodiment, the diamine comprises an aliphatic diamine; a cycloaliphatic diamine; an aralkyl diamine; or a mixture thereof. Preferable diamines for the invention herein include: 1,6-hexamethylenediamine; 1,6-cyclohexanedimethylamine; 1,3-diaminomethylbenzene; 2,2-dimethyl-1,3-propanediamine; $(H_2NCH_2CH_2(OCH_2CH_2))_vOCH_2CH_2NH_2$; wherein v is an integer of from 1 to 20, or a mixture thereof. In a preferred embodiment, the amount of diamine is from about 0 to about 50 parts by weight of the polymeric fluorescent compound wherein the sum of components i) to iv) is equal to 100 parts. In further, still preferred, embodiments, the diamine is from about 10 to about 50 parts by weight of the polymeric fluorescent compound wherein the sum of components i) to iv) is equal to 100 parts. Further preferably, the diamine is from about 20 to about 50 parts by weight of the polymeric fluorescent compound wherein the sum of components i) to iv) is equal to 100 parts. Still further preferably, the diamine is from about 30 to about 50 parts by weight of the polymeric fluorescent compound wherein the sum of components i) to iv) is equal to 100 parts. Yet still further preferably, the diamine is from about 40 to about 50 parts by weight of the polymeric fluorescent compound wherein the sum of components i) to iv) is equal to 100 parts.

In one embodiment of the invention herein, the sulfonate-containing monomer of the polymeric fluorescent compound has at least one polyester reactive group. Preferably, the sulfonate-containing monomer is a dicarboxylic acid or an ester thereof comprising a sulfonate group; a glycol comprising a sulfonate group; or a hydroxyacid containing a sulfonate group, such as benzene; naphthalene; diphenyl; oxydiphenyl; sulfonyldiphenyl or methylenediphenyl nucleus; or a mixture thereof. Further preferably, the sulfonate group is attached to an aromatic group. In a further preferable embodiment, the sulfonate group comprises an alkali earth metal; an alkaline earth metal; a transition metal; a lathanide or an actinide. In a particularly preferred embodiment, the sulfonate group comprises a metal ion selected from the group consisting of sodium; lithium; potassium; or a mixture thereof.

In another embodiment, the sulfonate-containing monomer comprises sulfophthalic acid; sulfoterephthalic acid; sulfoisophthalic acid; 4-sulfonaphthalene-2,7-dicarboxylic acid; 5-sulfoisophthalic acid; the salt or ester thereof; or a mixture thereof. In a preferred embodiment, the sulfonate-containing monomer is 5-sodiosulfoisophthalic acid. In an even more preferred embodiment, the sulfonate-containing monomer is 5-sodiosulfoisophthalic acid and the diol component comprises ethylene glycol; 1,4-cyclohexanedimethanol; diethylene glycol; or a mixture thereof.

Through the invention herein, it is possible to exchange the metal ion by ion-exchange to alter the characteristics of the polymeric fluorescent compound. In one embodiment, when a monovalent alkali metal ion is used, the resulting polymeric fluorescent compounds are more readily dispersed in hot water.

Further, the amount of sulfonate-containing monomer utilized in the invention herein will vary depending upon the amount of glycol selected. For example, in one embodiment, the water dispersibility of the polymeric fluorescent compound is related to the weight percent of poly(ethylene glycol) and mole percent of the sulfonate-containing monomer present. Therefore, if the content of either material is low, the other should be kept higher so that dispersibility of the polymeric fluorescent compound is maintained. In a preferred embodiment of the invention, the amount of sulfonate-containing monomer is from about 5 to about 65, more preferably from about 8 to about 30 parts by weight of the total polymeric fluorescent compound, wherein the sum of the components in the polymeric fluorescent compound is equal to 100 parts.

The optical brightener agent of the polymeric fluorescent compound preferably comprises at least one polyester reactive group. In another preferred embodiment of the invention, the optical brightener agent has at least two polyester reactive groups.

In separate embodiments of the invention herein, the optical brightener agent is preferably present in the polymeric fluorescent compound in the amount of less than or equal to about 2000 ppm (part per million), less than or equal to about 1750 ppm, less than or equal to about 1500 ppm, or less than or equal to about 1250 ppm. In further separate preferred embodiments, the optical brightener agent is present at less than or equal to about 1000 ppm, less than or equal to about 750 ppm, or less than or equal to about 500 ppm. The amount of optical brightener agent is measured relative to the total weight of the polymeric fluorescent compound.

In another embodiment, the optical brightener agents utilized herein are conjugated compounds. In another embodiment, when there are styryl and stilbenzyl groups present in the optical brightener agent, the stereochemistry about the carbon-carbon double bond can preferably be cis or trans, more preferably trans.

In one embodiment of the invention herein, the optical brightener agent has the Structure I:

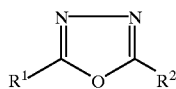

STRUCTURE I wherein $R^1$ and $R^2$ are, independently, naphthyl; diphenyl; aryl; alkenyl; alkynyl or heteroaryl and wherein $R^1$ and $R^2$ are substituted or unsubstituted. In a preferable embodiment, $R^1$ and $R^2$ are, independently, both aryl groups and the aryl group has the structure:

wherein, each $R^3$, independently, comprises an alkyl group; a cycloalkyl group; an aralkyl group; an alkenyl group; an alkynyl group; an alkoxy group; an alkenyloxy group; an alkynyloxy group; a substituted or unsubstituted amino group; a halogen; or a carboxyl group; wherein the carboxyl group comprises a carboxylic acid; an ester; an anhydride; a carbonyl halide; or a carbamide; and n is an integer of from 1 to 5. In a further preferred embodiment, $R^3$ has the structure:

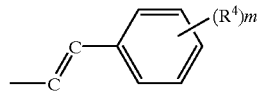

wherein each $R^4$, independently, comprises a polyester reactive group and m is an integer of from 1 to 3. In another preferred embodiment, $R^4$ comprises a carboxyl group, wherein the carboxyl group comprises a carboxylic acid; an ester; an anhydride; a carbonyl halide; or a carbamide.

In a further preferred embodiment of the invention, $R^1$ and $R^2$, independently, have the structure:

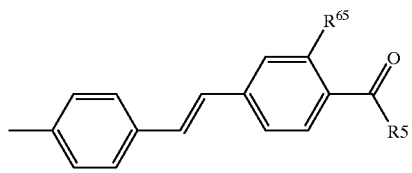

wherein $R^5$ comprises a hydroxyl group; an alkoxy group; an alkoxy hydroxy group; an alkenyloxy group; an alkynyloxy group; an amide; a halide; a carboxyl group or a substituted or unsubstituted amino group; and wherein $R^{65}$ comprises hydrogen; a halide; an alkyl group; or an alkoxy group. In a separate embodiment, $R^5$ is hydroxy; methoxy; ethoxy; butoxy; 2-ethyl-hexyloxy; $NHCH_2CH_2NH_2$; $OCH_2CH_2OH$; fluoro; chloro; bromo; or iodo; and $R^{65}$ is hydrogen. In a separate embodiment, $R^5$ is methoxy and $R^{65}$ is chloride; fluoride; methyl; or methoxy.

It should be noted that, as used throughout this specification, when a line in a structure does not expressly show a carbon atom, then the line is meant to denote a bond attachment, not an additional carbon atom. Therefore, in the immediately preceding structure, the line attached to the aryl ring denotes a chemical bond, not an additional carbon atom. Thus, the aryl ring of the structure is chemically bonded to oxadiazole ring of the Structure I at the para position.

In yet another embodiment, $R^1$ and $R^2$ are, independently, an alkenyl group, and each alkenyl group, independently, has the structure:

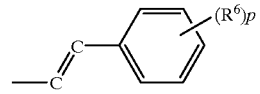

wherein $R^6$ is a polyester reactive group and p is an integer of from 1 to 3. In a preferred embodiment, $R^6$ comprises a carboxyl group, and the carboxyl group comprises a carboxylic acid; an ester; an anhydride; a carbonyl halide; or a carbamide. In a further preferred embodiment, $R^1$ and $R^2$, independently, have the structure:

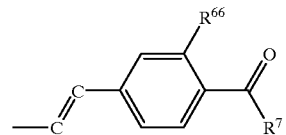

wherein $R^7$ comprises a hydroxyl group; an alkoxy group; an alkoxy hydroxy group; an alkenyloxy group; an alkynyloxy group; an amide; a halide; a carboxyl group or a substituted or unsubstituted amino group; and $R^{66}$ comprises hydrogen; a halide; an alkyl group; or an alkoxy group. In a further preferred embodiment, $R^7$ is hydroxy; methoxy; ethoxy; butoxy; 2-ethyl-hexyloxy; $NHCH_2CH_2NH_2$; $OCH_2CH_2OH$; fluoro; chloro; bromo; or iodo; and $R^{66}$ is hydrogen. In a still further preferred embodiment of the invention herein, $R^7$ is methoxy and $R^{66}$ is chloride; fluoride; methyl; or methoxy.

Compounds having the Structure I can be prepared, for example, using the methodology disclosed in U.S. Pat. No. 4,177,347 to Meyer and German Patent No. 4858/66 to Siegrist et al., the disclosures of which are each hereby incorporated by this reference in their entireties. Examples of compounds having the Structure I that may be utilized in the present invention are disclosed in German Patent No. 4858/66 to Siegrist et al.

In a further, still preferred, embodiment of the invention the optical brightener agent has the Structure II:

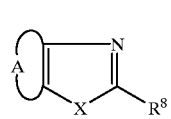

STRUCTURE II wherein A is the residue of a fused ring; $R^8$ is naphthyl; diphenyl; aryl; alkenyl; alkynyl or heteroaryl; wherein $R^8$ is substituted or unsubstituted; and X is —O—; —S—; or —N($R^9$); wherein $R^9$ is hydrogen; alkenyl or an unsubstituted or substituted alkyl; cycloalkyl or aryl; and wherein at least one polyester reactive group is present in the optical brightener agent. In a further preferred embodiment, $R^8$ has the structure:

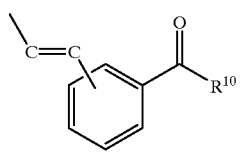

wherein $R^{10}$ is halogen or W—$R^{27}$; wherein W is —O— or —N($R^{28}$); and wherein $R^{27}$ and $R^{28}$ are, independently, hydrogen; alkenyl or an unsubstituted or substituted alkyl; cycloalkyl or aryl.

In yet a further embodiment of the invention herein, the optical brightener agent has the structure:

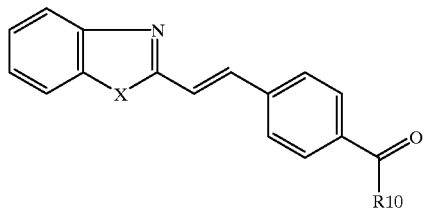

wherein X is —O—; —S—; or —NH—; and wherein $R^{10}$ is hydroxy; alkoxy; hydroxylalkylamine or di(hydroxyalkyl)amine.

Compounds having the Structure II can be prepared using the methodology disclosed in U.S. Pat. No. 3,274,184, the disclosure of which is hereby incorporated by this reference in its entirety. Examples of compounds having the Structure II that may be utilized in the processes and compounds of the present invention are disclosed in U.S. Pat. No. 4,803,241 to Weaver et al.; U.S. Pat. No. 4,978,476 to Allen et al.; U.S. Pat. No 3,912,697 to Pacifici; and U.S. Pat. No. 3,709,896 to Frischkorn et al., the disclosures of which are each hereby incorporated by this reference in their entireties.

In yet another embodiment of the invention herein, the optical brightener agent has the structure:

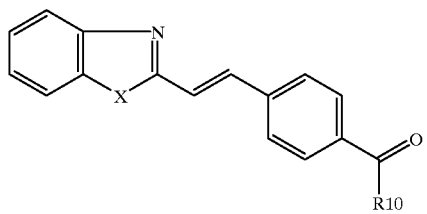

wherein X is —O—; —S—; or —NH—; and wherein $R^{10}$ is hydroxy; alkoxy; hydroxylalkylamine or di(hydroxyalkyl)amine.

In another, still preferred, embodiment the optical brightener agent has the structure:

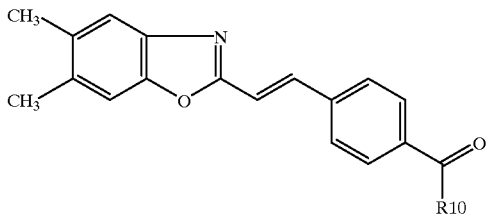

wherein $R^{10}$ is lower alkoxy; hydroxy; or chloro.

In another embodiment, the optical brightener agent has the structure:

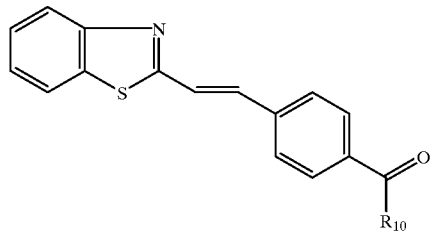

wherein $R^{10}$ is lower alkoxy; hydroxy; or chloro.

Another embodiment of the invention provides an optical brightener agent having the structure:

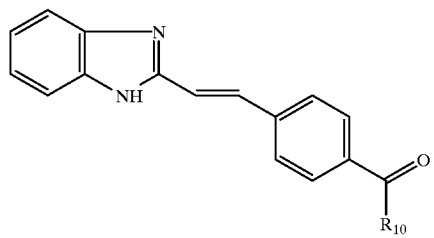

wherein $R^{10}$ is lower alkoxy; hydroxy; or chloro.

Still further, the optical brightener agent may have the structure:

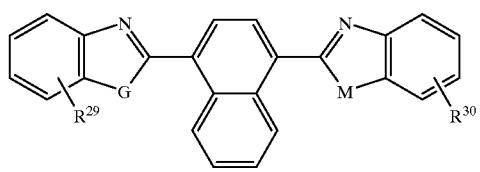

wherein $R^{29}$ is a polyester reactive group; $R^{30}$ is naphthyl; diphenyl; aryl; alkenyl; alkynyl; heteroaryl or a polyester reactive group, wherein $R^{30}$ is substituted or unsubstituted; and G and M are, independently, —O—; —S—; or $NR^{31}$; and wherein $R^{31}$ is branched or straight chain $C_1$–$C_{12}$.

A further embodiment of the invention provides an optical brightener agent having the structure:

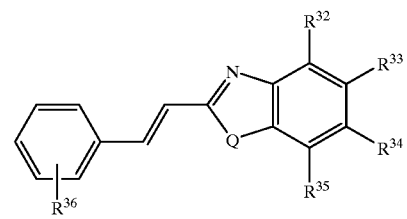

wherein $R^{32}$, $R^{33}$, $R^{34}$ and $R^{35}$ are independently hydrogen, substituted or unsubstituted lower alkyl; cycloalkyl; aryl; lower alkylaryl; alkoxy or a fused ring; $R^{36}$ is a polyester reactive group; and Q is —O—; —S—; or —$NR^{37}$; and wherein $R^{37}$ is branched or straight chain $C_1$–$C_{12}$.

In a further embodiment, the optical brightener agent has the structure

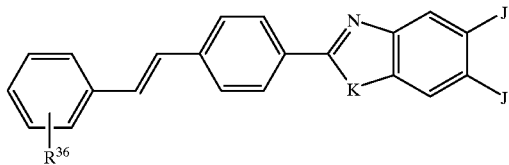

wherein K is —S—; —O—; or $NR^{50}$; wherein $R^{50}$ is $C_1$–$C_4$ branched or straight chain alkyl; wherein $R^{49}$ is a polyester reactive group; and wherein each J is, independently, hydrogen; a cyano group; a nitro group; or a trifluoromethyl group.

In another embodiment, the optical brightener agent has the structure

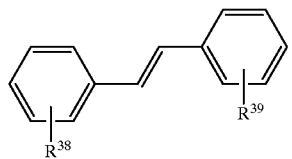

wherein $R^{38}$ is a polyester reactive group, and $R^{39}$ is naphthyl; diphenyl; aryl; alkenyl; alkynyl; cycloalkylene; heteroaryl; or a polyester reactive group and wherein $R^{39}$ is substituted or unsubstituted.

In a still further embodiment, the optical brightener agent is a benzopyran having the Structure IV:

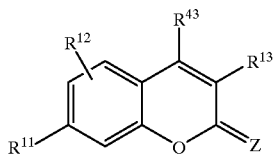

wherein $R^{11}$ is hydroxy; —$OR^{14}$ or —$OC(O)R^{15}$; wherein $R^{12}$ is hydrogen; alkyl; —$OR^{40}$ or halogen; wherein $R^{13}$ is cyano; —$C(O)R^{41}$; —$CO_2R^{41}$; carbamoyl; —$C(O)N(R^{42})(R^{41})$; —$SO_2R^{42}$; or a carbocyclic or heterocyclic aryl group; wherein $R^{43}$ is hydrogen; aryl; alkyl or —$CH_2CO_2R^{44}$; wherein $R^{14}$, $R^{40}$ and $R^{42}$ are, independently, alkenyl; alkyl; cycloalkyl; or aryl; wherein $R^{15}$, $R^{41}$ and $R^{42}$ are, independently, hydrogen; alkyl; cycloalkyl; or aryl; wherein $R^{44}$ is alkyl; cycloalkyl or an aryl radical; and wherein Z is oxo or imino; wherein the benzopyran has at least one polyester reactive group.

In yet another embodiment, the optical brightener agent has the structure:

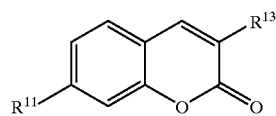

wherein $R^{11}$ is hydroxy; hydroxyalkoxy; alkanoyloxyalkoxy; alkoxycarbonylalkoxy; or alkoxycarbonylphenylalkoxy; wherein $R^{13}$ is alkoxycarbonyl; arylsulfonyl; cyano; 2-benzoxazolyl; 2-benzothiazolyl; 2-benzoxazolyl; or 2-benzimidazolyl; wherein each alkoxy group of $R^{11}$ and $R^{13}$, independently, has from one to six carbon atoms; and wherein each aryl group, independently, is a phenyl group or phenyl substituted with a $C_1$–$C_4$ alkyl group or halogen.

In a further embodiment, the optical brightener agent has the structure:

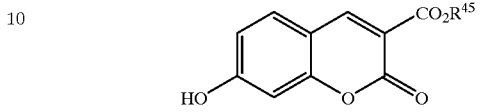

wherein $R^{45}$ is an alkyl of from one to six carbon atoms.

In a further embodiment, the optical brightener agent has the structure:

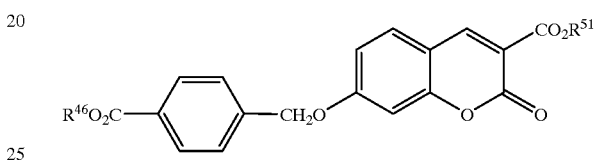

wherein $R^{51}$ and $R^{46}$ are, independently, an alkyl group of from one to six carbon atoms.

In yet another embodiment of the invention herein, the optical brightener agent has the structure:

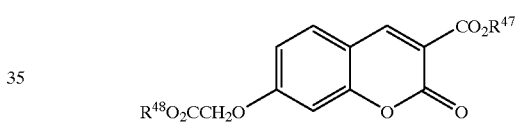

wherein $R^{47}$ and $R^{48}$ are, independently, an alkyl group of from one to six carbon atoms.

In another embodiment, the invention provides an optical brightener agent of the structure:

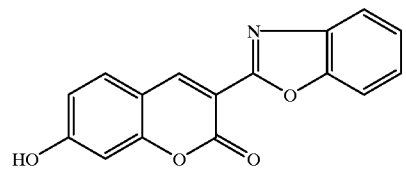

In a further embodiment, the amount of the optical brightener agent is from about 0.00001 to about 30 parts by weight of the polymeric fluorescent compound. Still further, the optical brightener agent may be from about 0.000001 to about 20 parts by weight, from about 0.00001 to about 10 parts by weight, and from about 0.00001 parts to about 1 part by weight of the polymeric fluorescent compound. In a further embodiment, the optical brightener compound has at least two polyester reactive groups.

The invention further provides an embodiment wherein the optical brightener-agent comprises a phthalocyanine; a 2,3-naphthalocyanine; or a squaraine.

The benzopyran compounds having Structure IV can be prepared according to published procedures or variations thereof which will be readily apparent to those skilled in the art. References pertaining to the preparation of compounds having the Structure IV include *The Chemistry of Coumarins* by S. Sethna and N. M. Shan, *Chem. Rev.*, 36, 1; *Coumarins, Heterocyclic Compounds,* ed. R. C. Elderfield, Vol. 2, p. 173; *Coumarin and Its Derivatives, Chemistry of Carbon Compounds,* C. H. Rodd, Vol. IVB, p. 869; and U.S. Pat. Nos. 4,055,568; 4,018,796; 3,933,847; 3,910,912; 3,801,602; 3,704,302; and 3,533,730, the disclosures of which are each hereby incorporated by this reference in their entireties. Examples of compounds having the Structure IV that may be utilized in the present invention are disclosed in U.S. Pat. No. 4,882,412 to Weaver et al., the disclosure of which is hereby incorporated by this reference in its entireties.

Still further, the invention includes a near infrared fluorescing compound having the structure:

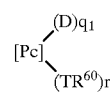

V

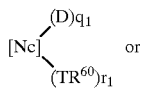

VI or

VII

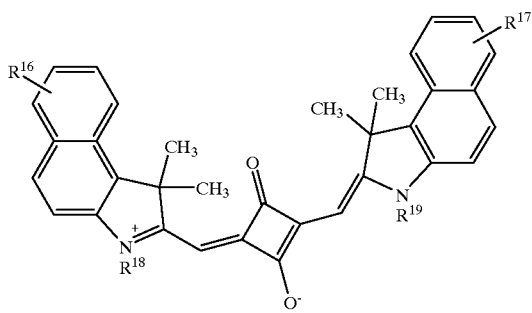

wherein Pc represents a phthalocyanine moiety having the structure VIII and Nc represents a 2,3-naphthalocyanine moiety having the structure IX:

VIII

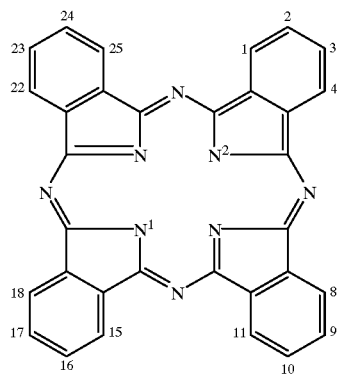

IX

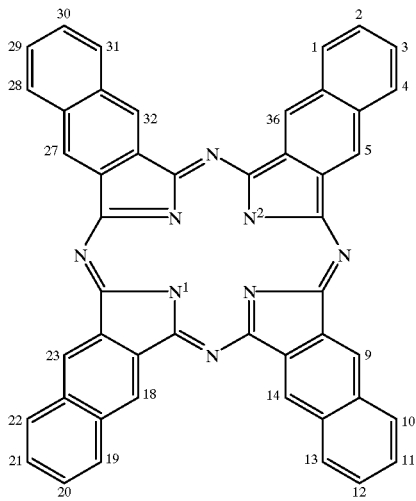

wherein $N^1$ and $N^2$ can, independently, be bonded to hydrogen or to various metals comprising halometals, organometallic groups, and oxymetals comprising AlCl; AlBr; AlF; AlOH; $AlOR^{20}$; Ca; Ge; Ga; InCl; Mg; $SiCl_2$; $SiF_2$; $SnCl_2$; $Sn(OR^{21})_2$; $Si(OR^{21})_2$; $Sn(SR^{21})_2$; $Si(SR^{21})_2$; Sn; or Zn; wherein $R^{20}$ and $R^{21}$ are selected from hydrogen; alkyl; aryl; lower alkanoyl; trifluoroacetyl or groups of the formula:

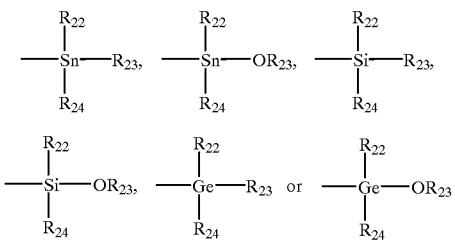

wherein $R^{22}$, $R^{23}$ and $R^{24}$ are, independently, selected from alkyl; phenyl; or phenyl substituted with lower alkyl; lower alkoxy; or halogen; wherein T is selected from oxygen; sulfur; selenium; tellurium or a group of the formula —$NR^{25}$, wherein $R^{25}$ is hydrogen; cycloalkyl; alkyl; acyl; alkylsulfonyl; or aryl; or wherein $R^{25}$ and $R^{60}$, taken together, form an aliphatic or aromatic ring with the nitrogen atom to which they are attached; wherein D is selected from alkyl; aryl; halogen or hydrogen; wherein $R^{60}$ is selected from unsubstituted or substituted alkyl; alkenyl; alkynyl; $C_3$–$C_8$ cycloalkyl; aryl; heteroaryl;

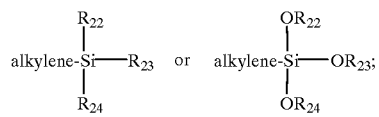

wherein —$(TR^{60})$ is alkylsulfonylamino; arylsulfonylamino; or a group selected from the formula —$C(C_2H_4O)_e$ $R^{26}$;

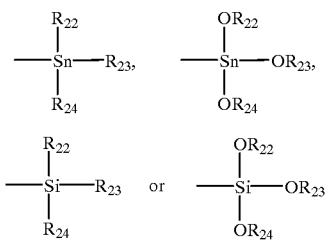

wherein $R^{26}$ is hydrogen or $R^{60}$ as defined above; e is an integer of from 1–4; or two $-(TR^{60})_r$ groups can be taken together to form divalent substituents of the formula

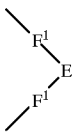

wherein each $F^1$ is, independently, $-O-$; $-S-$; or $-N-R^{25}$; and wherein E comprises an alkyl group comprising ethylene; propylene; or trimethylene, wherein the alkyl group is substituted with $C_1-C_4$ alkyl; $C_1-C_4$ alkoxy; aryl; cycloalkyl; 1,2-phenylene; and 1,2-phenylene containing from 1 to 3 substituents selected from $C_1-C_4$ alkyl; $C_1-C_4$ alkoxy; or halogen; wherein $R^{16}$ and $R^{17}$ are independently selected from hydrogen; lower alkyl; lower alkoxy; halogen; aryloxy; lower alkylthio; arylthio; lower alkylsulfonyl; arylsulfonyl; lower alkylsulfonylamino; arylsulfonylamino; cycloalkylsulfonylamino; carboxy; unsubstituted and substituted carbamoyl and sulfamoyl; lower alkoxycarbonyl; hydroxy; lower alkanoyloxy;

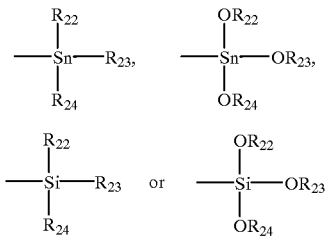

wherein $R^{18}$ and $R^{19}$ are independently hydrogen; lower alkyl; alkenyl or aryl; wherein q is an integer from 0 to 12 and r is an integer from 4 to 16 provided that the sum of q and r is 16 and at least one polyester reactive group is present, and wherein $q_1$ is an integer from 0 to 24 and $r_1$ is an integer from 0 to 16, provided that the sum of $q_1$ and $r_1$ is 24 and at least one polyester reactive group is present.

In a further, still preferred, embodiment, the optical brightener agent is a squaraine compound having the structure VI wherein $R^{16}$ and $R^{17}$ are, independently, carboxy or lower alkoxycarbonyl. In yet another embodiment of the invention herein, the optical brightener agent is a 2,3-naphthalocyanine compound having the structure VI, wherein D is hydrogen, q1 is 24, r1 is 24 and r1 is 0. In a still further embodiment of the invention herein, the optical brightener agent is a 2,3-naphthalocyanine compound having structure VI, wherein the naphthalocyanine moiety is bonded to $SiCl_2$; $Si(OH)_2$; or $Si(OR^{21})_2$. Still further, the optical brightener agent is a phthalocyanine compound having the structure V, wherein T is oxygen, R is aryl, D is hydrogen, r is 4, and q is 12, and wherein the phthalocyanine moiety is bonded to AlCl; AlOH; $ALOC(O)CF_3$; $ALOR^{20}$; $SiCl_2$; $Si(OH)_2$; $Si(OR^{21})_2$; GaCl; GaOH; $GaOC(O)CF_3$; $GaOR^{20}$; InCl; InOH; $InOCOCF_3$; $InOR^{20}$; magnesium; zinc; or hydrogen.

The amount of optical brightener agent used in the polymeric fluorescent compound and/or the acrylic polymer-optical brightener compositions can vary depending upon the intended function of the ultraviolet-absorbing residue and/or the end use for which the acrylic polymer-optical brightener compositions are intended. In one embodiment, the amount of the optical brightener agent is from about 0.00001 to about 30 parts by weight of the total polymeric fluorescent compound. Still further, the amount of optical brightener agent may be from about 0.00001 to about 20 parts by weight of the total polymeric fluorescent compound, from about 0.00001 to about 10 parts polymeric fluorescent compound, and from about 0.00001 to about 1 part by weight of the total polymeric fluorescent compound.

The Applicants have unexpectedly discovered that when a monomer with at least one polyester reactive group comprises the optical brightener compound of the present invention, the monomer can be copolymerized with a monomer comprising a dicarboxylic acid or ester; a monomer comprising a diol, a diamine or a mixture thereof; and a monomer comprising at least one sulfonate group and at least one polyester reactive group; to provide a polymeric fluorescent compound. In one embodiment, optical brightener compound has at least two polyester reactive groups.

Furthermore, Applicants have unexpectedly discovered that a monomer of a near-infrared absorbing compound having at least one polyester group can be copolymerized with components i)- iv) of the polymeric fluorescent compounds to produce a polymeric fluorescent polymer that exhibits fluorescing and/or near-infrared absorbing characteristics. Therefore, in a further embodiment, the polymeric fluorescent compounds may be included with polymeric near infrared absorbing compounds in forming acrylic polymer compositions according to the processes of the present invention. In one embodiment, the near infrared absorbing agent having at least one polyester group is copolymerized with the materials that comprise the polymeric fluorescent compound i.e., the monomer comprising a dicarboxylic acid or ester; the monomer comprising a diol, a diamine or a mixture thereof; the monomer comprising at least one sulfonate group and at least one polyester reactive group; and the monomer comprising an optical brightener agent having at least one polyester reactive group, to form a copolymerized optical brightener agent-near infrared absorbing agent. The copolymerized optical brightener agent-near infrared absorbing agent may then be utilized in the processes of the present invention to form acrylic polymer compositions as contemplated herein.

In a further embodiment, the fully formed polymeric near infrared absorbing compounds may be added to the fully formed polymeric fluorescent compounds and both compounds added to the acrylic monomer of the present invention to form acrylic polymer compositions according to the processes of the present invention. In this embodiment, the polymeric compounds are not copolymerized but, rather, form a mixture that is then included in the processes of the present invention.

In yet another surprising discovery, Applicants have determined that polymeric near infrared absorbing agents can also be included with the acrylic polymers of this invention to form acrylic polymer-near infrared absorbing agent compositions. Therefore, in one embodiment, the invention comprises acrylic polymer-near infrared absorbing agent compositions comprising: a) a first polymer comprising repeat units of a monomer having the formula $CH_2=CR^A-C(O)OR^B$, wherein $R^A$ and $R^B$ are each, independently, a $C_1$ to $C_8$ straight or branched alkyl group and wherein $R^A$ can be hydrogen; and b) a polymeric near infrared absorbing compound wherein the polymeric near infrared absorbing compound comprises repeat units of residues of: i) a monomer comprising a dicarboxylic acid or ester; ii) a monomer comprising a diol, a diamine or a mixture thereof; iii) a monomer comprising at least one sulfonate group and at least one polyester reactive group; and iv) a monomer comprising a near infrared absorbing compound having at least one polyester reactive group. Preferably, the polymeric near infrared compound is located within the acrylic polymer particle and is at or near the surface of the acrylic particle. When made according to the processes of the present invention, the acrylic polymer compositions having near infrared absorbing compounds are surprisingly stable.

In a particularly preferred embodiment, near-infrared fluorescent compounds useful in the aforementioned embodiments of the present invention are described in detail in U.S. Pat. No. 5,553,714, the disclosure of which is hereby incorporated by reference in its entirety.

In further preferred embodiments, the near infrared absorbing compound comprises a phthalocyanine, a napthalocyanine, a squaraine, or a mixture thereof. In another embodiment, the near-infrared absorbing compound comprises a phthalocyanine, a 2,3-napthalocyanine or a squaraine.

In one embodiment, the near-infrared absorbing compound has the Structure V, VI or VII:

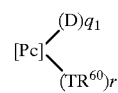
V

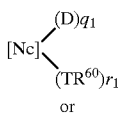
VI or

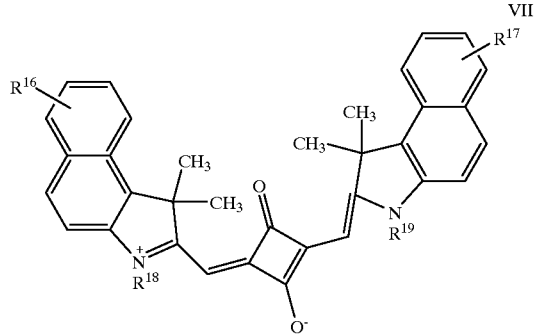
VII wherein Pc represents a phthalocyanine moiety having the structure VIII and Nc represents a 2,3-naphthalocyanine moiety having the structure IX:

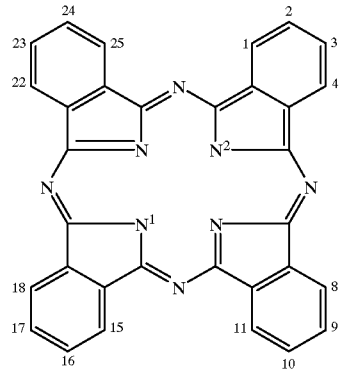
VIII

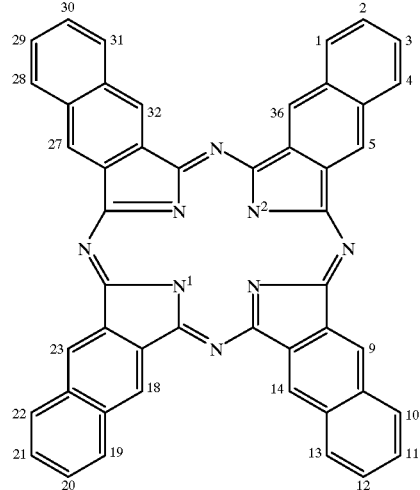
IX wherein $N^1$ to $N^2$ can, independently, be bonded to hydrogen or to various metals comprising halometals, organometallic groups, and oxymetals comprising AlCl; AlBr; AlF; AlOH; $AlOR^{20}$; Ca; Ge; Ga; InCl; Mg; $SiCl_2$; $SiF_2$; $SnCl_2$; $Sn(OR^{21})_2$; $Si(OR^{21})_2$; $Sn(SR^{21})_2$; $Si(SR^{21})_2$; Sn; or Zn; wherein $R^{20}$ and $R^{21}$ are selected from hydrogen; alkyl; aryl; lower alkanoyl; trifluoroacetyl or groups of the formula:

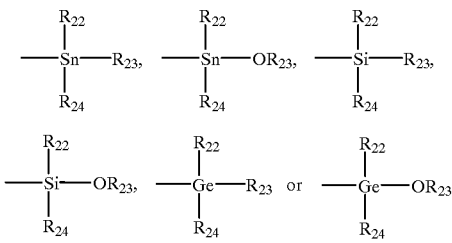

wherein $R^{22}$, $R^{23}$ and $R^{24}$ are, independently, selected from alkyl; phenyl; or phenyl substituted with lower alkyl; lower alkoxy; or halogen; wherein T is selected from oxygen; sulfur; selenium; tellurium or a group of the formula $-NR^{25}$, wherein $R^{25}$ is hydrogen; cycloalkyl; alkyl; acyl; alkylsulfonyl; or aryl; or wherein $R^{25}$ and $R^{60}$ taken together form an aliphatic or aromatic ring with the nitrogen atom to which they are attached; wherein D is selected from alkyl; aryl; halogen or hydrogen; wherein $R^{60}$ is selected from unsubstituted or substituted alkyl; alkenyl; alkynyl; $C_3-C_8$ cycloalkyl; aryl; heteroaryl;

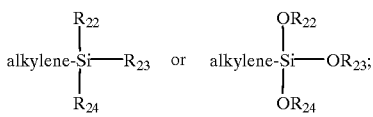

wherein —(TR$^{60}$)$_r$ is alkylsulfonylamino; arylsulfonylamino; or a group selected from the formula —C(C$_2$H$_4$O)$_e$R$^{26}$,

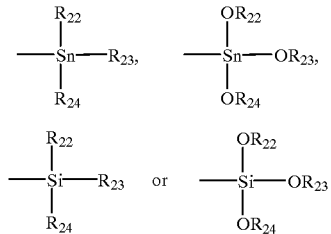

wherein R$^{26}$ is hydrogen or R$^{60}$ as defined above; e is an integer of from 1–4; or two —(TR$^{60}$)$_r$ groups can be taken together to form divalent substituents of the formula;

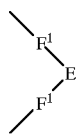

wherein each F$^1$ is, independently, —O—; —S—; or —N—R$^{25}$; and wherein E comprises an alkyl group comprising ethylene; propylene; or trimethylene, wherein the alkyl group is substituted with C$_1$–C$_4$ alkyl; C$_1$–C$_4$ alkoxy; aryl; cycloalkyl; 1,2-phenylene; and 1,2-phenylene containing from 1 to 3 substituents selected from C$_1$–C$_4$ alkyl; C$_1$–C$_4$ alkoxy; or halogen; wherein R$^{16}$ and R$^{17}$ are independently selected from hydrogen, lower alkyl, lower alkoxy, halogen; aryloxy; lower alkylthio; arylthio; lower alkylsulfonyl; arylsulfonyl; lower alkylsulfonylamino; arylsulfonylamino; cycloalkylsulfonylamino; carboxy; unsubstituted and substituted carbamoyl and sulfamoyl; lower alkoxycarbonyl; hydroxy; lower alkanoyloxy;

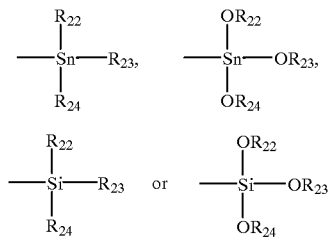

wherein R$^{18}$ and R$^{19}$ are independently hydrogen; lower alkyl; alkenyl or aryl; wherein q is an integer from 0 to 12 and r is an integer from 4 to 16 provided that the sum of q and r is 16 and at least one polyester reactive group is present, and wherein q$_1$ is an integer from 0 to 24 and r$_1$ is an integer from 0 to 16, provided that the sum of q$_1$ and r$_1$ is 24 and at least one polyester reactive group is present.

In a further, still preferred, embodiment, the near infrared absorbing compound is a squaraine compound having the structure VI wherein R$^{16}$ and R$^{17}$ are independently carboxy or lower alkoxycarbonyl. In yet another embodiment of the invention herein, the near infrared absorbing compound is a 2,3-naphthalocyanine compound having the structure VI, wherein D is hydrogen q1 is 24, r1 is 24 and r1 is 0. In a still further embodiment of the invention herein, the near infrared absorbing compound is a 2,3-naphthalocyanine compound having structure VI, wherein the naphthalocyanine moiety is bonded to SiCl$_2$; Si(OH)$_2$; or Si(OR$^{21}$)$_2$. Still further, the optical brightener agent is a phthalocyanine compound having the structure V, wherein T is oxygen, R is aryl, D is hydrogen, r is 4, and q is 12, and wherein the phthalocyanine moiety is bonded to AlCl; AlOH; ALOC(O)CF$_3$; ALOR$^{20}$; SiCl$_2$; Si(OH)$_2$; Si(OR$^{21}$)$_2$; GaCl; GaOH; GaOC(O)CF$_3$; GaOR$^{20}$; InCl; InOH; InOCOCF$_3$; InOR$^{20}$; magnesium; zinc; or hydrogen.

Further examples of near infrared compounds useful in the practice of this invention are disclosed in GB 1,537,375; U.S. Pat. Nos. 4,606,859 and 4,904,567; U.K. Pat. Appl. GB 2,168,372; JACS, 1984, 106, pp 7404–7410; Japanese Pat. No. 61,215,663 (abstract, CA Vol. 114: 196445p); and Japanese Pat. No. 90,187,391 (abstract, CA Vol. 114: 196418g), each of which are each hereby incorporated by this reference in their entireties. U.S. Pat. No. 5,292,855 discloses near-infrared agents and polymers containing near-infrared agents that may be utilized in the embodiments of the present invention.

With respect to the polymeric fluorescent compound comprising the optical brightener agent, it is preferred that at least 20% of the groups linking the monomeric units are ester linkages. In another embodiment, the polymeric fluorescent compound has an intrinsic viscosity of from 0.15 to 0.45 dL/g, preferably from 0.25 to 0.35 dL/g as determined by the ASTM method D2857.70.

In one embodiment, the polymeric fluorescent compound used in the various embodiments of the present invention are water dispersible. The term "water dispersible" is defined as the activity of a water or aqueous solution on the polymeric fluorescent compound of the present invention. The term is specifically intended to cover those situations when the solvent dissolves and/or disperses the polymeric fluorescent compound of the present invention.

In another embodiment, the polymeric fluorescent compound used in the present invention is dispersible or soluble in an organic solvent. Examples of organic solvents include, but are not limited to, methylene chloride, methyl ethyl ketone, or ethanol.

In another embodiment, the polymeric near infrared absorbing compound used in the present invention is dispersible or soluble in an organic solvent. Examples of organic solvents include, but are not limited to, methylene chloride, methyl ethyl ketone, or ethanol.

One of skill in the art will recognize that various additives may be included in the compositions of the present invention. Such additives include a pigment (organic or inorganic) and/or other additives or fillers known in the art. Such additives or fillers, include, but are not limited to, leveling, rheology, and flow control agents such as silicones, fluorocarbons, urethanes, or cellulosics, extenders, reactive coalescing aids such as those described in U.S. Pat. No. 5,349,026, flatting agetns, pigment wetting and dispersing agents and surfactants, ultraviolet absorbers, ultraviolet light stabilizers, tinting pigments, extenders, defoaming and antifoaming agents, anti-setting, anti-sag and bodying agents, anti-skinning agents, anti-flooding and anti-floating agents, fungicides and mildewcides, preservatives, corrosion inhibitors, thickening agents, plasticicers, reactive plasticizers, curing agents or coalescing agents. Specific examples of such additives can be found in *Raw Materials Index,* published by the National Paint & Coatings Association, 1500 Rhode Island Avenue, NW, Washington, D.C. 20005, U.S.A.

The present invention also provides processes for preparing a composition comprising a waterborne acrylic polymer and an optical brightener agent composition. In a preferred embodiment, the process comprises:

a) dispersing about 0.1 to about 50.0% by weight of a polymeric fluorescent compound;

b) mixing the dispersion with at least one acrylic monomer having the formula $CH_2=CR^A—C(O)OR^B$, wherein $R^A$ and $R^B$ are each, independently, $C_1$ to $C_8$ straight or branched alkyl groups and wherein $R^A$ can be hydrogen; and c) polymerizing the acrylic monomer.

In a particularly preferred embodiment, the process comprises emulsifying the material from steps a) and b) prior to polymerizing the acrylic monomer. In a further preferred embodiment, the waterborne acrylic polymer-optical brightener composition has a solids content of from about 20 to about 60 weight %, as measured by the total weight of the waterborne acrylic polymer composition. In a further preferred embodiment, the waterborne acrylic polymer-optical brightener composition has a solids content of from about 30 to about 60 weight %, as measured by the total weight of the waterborne acrylic polymer-optical brightener composition. Still further, the waterborne acrylic polymer-optical brightener composition has a solids content of from about 40 to about 60 weight %, as measured by the total weight of the waterborne acrylic polymer-optical brightener composition. In a further preferred embodiment, the waterborne acrylic polymer-optical brightener composition has a solids content of from about 50 to about 60 weight %, as measured by the total weight of the acrylic polymer composition.

In a further preferred embodiment of the processes herein, the polymeric fluorescent compound is dispersed in water at from about 60 to about 95° C., still preferably, the polymeric fluorescent compound is dispersed in water at from about 70 to about 95° C., still preferably, the polymeric fluorescent compound is dispersed in water at from about 80 to about 95° C.

In yet another preferred embodiment, the emulsion polymerization step takes place in a reactor heated to from about 40 to about 95° C., still further preferably, the emulsion polymerization step takes place in a reactor heated to from about 50 to about 95° C., further preferably, the emulsion polymerization step takes place in a reactor heated to from about 60 to about 95° C., still preferably, the emulsion polymerization step takes place in a reactor heated to from about 70 to about 95° C., and yet further preferably, the emulsion polymerization step takes place in a reactor heated to from about 80 to about 95° C.

In a further preferred embodiment, the polymeric fluorescent compound is from about 0.1 to about 5 weight % of the acrylic polymer composition. In yet a further embodiment, the polymeric fluourescent compound is present at from about 1 to about 10 weight % of the acrylic polymer composition; still further preferably, the polymeric fluorescent compound is present at from about 1 to about 20 weight % of the acrylic polymer composition; yet still preferably, the polymeric fluorescent compound is present at from about 1 to about 30 weight % of the acrylic polymer composition. In a further preferred embodiment, the polymeric fluorescent compound is present at from about 1 to about 40 weight % of the acrylic polymer composition and, still preferably, the polymeric fluorescent compound is present at from about 1 to about 50 weight % of the acrylic polymer composition. In yet still further preferred embodiments, the polymeric fluorescent compound is present at from about 1, 5, 10 or 20 weight percent of the acrylic polymer composition.

The present invention also provides processes wherein the acrylic polymer-optical brightener agent composition further comprises a polymeric near infrared absorbing compound. As discussed previously, the polymeric near infrared absorbing compound may or may not be copolymerized with the polymeric fluorescent compound. However, in each of these embodiments, both the polymeric fluorescent compound and the polymeric near infrared absorbing compound are preferably situated at or near the surface of the acrylic polymer particles that form the compositions of the present invention.

In the processes of the invention herein, the specific compounds, methods and quantities disclosed above with respect to the compositions of the present invention are also applicable.

In one preferred embodiment of the invention, a 10 to 30 weight % portion of a polymeric fluorescent compound-acrylic monomer emulsion is heated to from about 30 to about 85° C., more preferably from about 50 to about 70° C., and an aqueous solution of initiator and remaining emulsion, if any, is slowly injected into the reaction mixture.

In another preferred embodiment of the invention, the aqueous solution containing surfactant and polymeric fluorescent compound dispersion is poured into a reactor. Nitrogen gas is injected to replace air from the reactor. The reactor is then heated to from about 50 to about 70° C. while continuously stirring the mixture. After heating, the acrylic monomer(s) and an aqueous solution of initiator is slowly injected into the reactor to provide an acrylic polymer-optical brightener agent composition.

In a further preferred embodiment of the invention, a 10 to 30 weight % portion of a polymeric near infrared absorbing compound-acrylic monomer emulsion is heated to from about 30 to about 85° C., more preferably from about 50 to about 70° C., and an aqueous solution of initiator and remaining emulsion, if any, is slowly injected into the reaction mixture.

In another preferred embodiment of the invention, the aqueous solution containing surfactant and polymeric near infrared absorbing compound dispersion is poured into a reactor. Nitrogen gas is injected to replace air from the reactor. The reactor is then heated to from about 50 to about 70° C. while continuously stirring the mixture. After heating, the acrylic monomer(s) and an aqueous solution of initiator is slowly injected into the reactor to provide an acrylic polymer-near infrared absorbing composition.

The invention further provides products made by the processes above.

The present invention also provides methods for marking an article, comprising applying to the article the acrylic polymer-optical brightener, with or without polymeric near infrared absorbing compounds compositions described in detail above. In a preferred embodiment, the article comprises a container, paper, coating, ink, paint, wallpaper, wallboard, fiber, film, a plastic object, wood, concrete, metal, ceramic or thermoplastic composite. In a further preferred embodiment, the acrylic polymer-optical brightener composition is applied to the article by conventional printing, digital printing (i.e., ink jet, thermal transfer, electrophotographic, dielectric), coating, spray-coating, dip coating, or painting. Conventional printing includes, but is not limited to, offset lithographic printing, flexographic printing, screen printing, or gravure printing. In another embodiment, the acrylic polymer-optical brightener composition can be incorporated within and throughout the article or composition. The water dispersible acrylic polymer-optical brightener composition can be melt blended with other polymers and extruded to produce films, fibers, and plastics. In another embodiment, the acrylic polymer can be applied to the surface of an article to form a film. When the film dries, it produces blue fluorescent light when exposed to ultraviolet radiation.

Still further, the invention provides an article contacted with the acrylic polymer-optical brightener compositions of above.

Any radiation or light source that produces ultraviolet radiation can be used to expose an article or composition contacted with a polymer of the present invention. The emitted light is preferably detected by a blue visible radiation detector, which allows the marking or identification of items to which the film forming polymeric composition has been applied. The polymers of the present invention can be applied to various articles or compositions including, but not limited to, a container, paper, coating, ink, paint, wallpaper, fiber, film, plastic, wood, concrete, metal ceramic or composite in order to mark or tag the article or composition.

In another embodiment, an article or composition contacted with an acrylic polymer of the present invention can be exposed to ultraviolet radiation, near-infrared radiation, or both in order to identify an article or composition. Another advantage of the present invention is that the polymeric compositions produce an essentially "colorless" film when applied to an article. The film, however, is readily detected by conventional blue visible and near-infrared sensitive detector units. Once an article or composition has been contacted with the polymer, the article or composition is invisibly marked. Many of the optical brightener compounds used in this invention absorb little, if any, visible light when used at low levels.

The present invention further provides methods for distinguishing a fluorescing article from a non-fluorescing article, comprising:

a) exposing an article contacted with the compositions disclosed above to ultraviolet radiation; and b) detecting an emitted blue visible light from the irradiated article via blue visible light detection means.

In yet a further embodiment, a fluorescing article is separated from a non-fluorescing article. In a preferred method, the ultraviolet radiation is in the range from about 220 to about 400 nm. In yet a further preferred embodiment, the ultraviolet radiation is in the range of from about 280 to about 380 nm.

In yet another preferred embodiment, the invention provides a method for distinguishing a fluorescing article from a non-fluorescing article, comprising:

a) exposing an article contacted with the compositions disclosed above to ultraviolet radiation, near-infrared radiation, or both; and b) detecting an emitted blue visible light, a near-infrared or fluorescent light, or a mixture thereof from the irradiated article via a blue visible, near-infrared or fluorescence detection means.

In yet another embodiment, the article so distinguished may then be separated.

In a still further embodiment, an article contacted with the compositions described above is exposed to and detected for an emitted ultraviolet radiation. In a preferred embodiment, the article is exposed to and detected for near-infrared radiation. In yet another embodiment, the article is exposed to and detected for blue visible radiation and near-infrared-radiation. In a preferred embodiment, the near infrared radiation is in the range of from about 220 to about 400 nm. In a further preferred embodiment, the near-infrared radiation is in the range of from about 640 to about 1100 nm. In a further, still preferred, embodiment, the near-infrared radiation is in the range of from about 640 to about 950 nm.

The present invention also provides a method for detecting and separating a fluorescing article from a non-fluorescing article comprising:

a) exposing an article contacted with the compositions described above to blue visible, near-infrared radiation or both to provide a fluorescing and a non-fluorescing article; and b) detecting an emitted blue visible, a near-infrared light, or both from the irradiated article via blue visible, near-infrared or fluorescence detection means.

In a preferred embodiment, the fluorescing article is separated from a non-fluorescing article. In a further preferred embodiment, the article is exposed to ultraviolet radiation and detected for blue visible fluorescence radiation. In a further preferred embodiment, the article is exposed to near-infrared radiation and detected for near-infrared or fluorescent radiation. In a still further preferred embodiment, the article is exposed to and detected for blue visible fluorescence radiation and near-infrared radiation.

The invention herein also provides a method for enhancing or improving the optical brightness of an article or composition comprising contacting the article or composition with the acrylic polymer-optical brightener compositions described above. In a preferred embodiment, the composition to be enhanced or improved is an ink, coating or paint. In a further preferred embodiment, the article is a container, paper, film, fiber, or a plastic object.

In a further embodiment of the invention herein, the contacting step comprises coating or spraying the acrylic polymer-optical brightener compositions on the article or incorporating the compositions into the article.

EXAMPLES

The following examples are put forth so as to provide those of ordinary skill in the art with a complete disclosure and description of how the compositions of matter and methods claimed herein are made and evaluated, and are not intended to limit the scope of what the inventors regard as their invention. Efforts have been made to insure accuracy with respect to numbers (e.g., amounts, temperature, etc.) but some errors and deviations should be accounted for. Unless indicated otherwise, parts are by weight, temperature is in ° C. or is at room temperature and pressure is at or near atmospheric.

The materials and testing procedures used for the results shown herein are shown below.

PFC-A

PFC-A was prepared with 0.42 mole of dimethyl isophthalate, 0.08 mole of dimethyl 5-sodiosulfoisophthalate, 0.42 mole of diethylene glycol, 0.24 mole of cyclohexanedimethanol and 0.0004 mole of 2,5-bis(4'-carbomethoxystyryl)-1,3,4-oxadiazole, an optical brightener compound. The polymeric fluorescent compound (PFC-A) had an inherent viscosity (IV) of 0.36; a weight average molecular weight (Mw) of 10,653; a number average molecular weight (Mn) of 1,569; a polydispersity (Mw/Mn) of 6.7897, a glass transition temperature (Tg) of 48° C., and contained about 1,000 ppm of the copolymerized optical brightener. UV/VIS (Millipore water) $\lambda$max. 348 nm (vs 343nm for without polymerized optical brightener). Fluorescence emission (Millipore water) $\lambda^{em}$max 427 nm (vs $\lambda^{em}$max 419 nm for optical brightener only). The PFC-A was also prepared with higher concentration of fluorescent compound in the polymer.

PFC-B

PFC-B was prepared according to the same procedure as PFC-A, except that 2,5-bis(4'-carbomethoxy-stilbenzyl)-1,3,4-oxadiazole was used instead of 2,5-bis(4'-carbomethoxystyryl)-1,3,4-oxadiazole as an optical brightener compound. The PFC-B contained 1,000 ppm of fluorescent compound. The polymerized fluorescent compound B (PFC-B) had an inherent viscosity (IV) of 0.363; a weight average molecular weight (Mw) of 20,976; a number average molecular weight (Mn) of 9,595; a polydispersity (Mw/Mn) of 2.1861; and a glass transition temperature (Tg) of 53° C. UV/VIS (Millipore water) $\lambda$max 373 nm (vs 365 nm for fluorescent compound only in $CH_2Cl_2$/TFA). Fluorescence emission (Millipore water) $\lambda^{em}$max 407,429 nm (vs $\lambda^{em}$max 399,422 nm for fluorescent compound only when excited at 365 nm). The PFC-B was also prepared with higher concentration of fluorescent compound in the polymer.

PFC-C

PFC-C was prepared using the same procedure as above except that a near-infrared fluorescent monomer, silicon (IV) 2,3-naphthalocyanine dihydroxide (1,000 ppm), which is referred to as NIRF, was used together with the optical brightener compound used for preparing PFC-B. The polymeric fluorescent compound (PFC-C) had an inherent viscosity (IV) of 0.329; a weight average molecular weight (Mw) of 16,613; a number average molecular weight (Mn) of 4,367; a polydispersity (Mw/Mn) of 3.8042; and a glass transition temperature (Tg) of 53° C. The PFC-C was also prepared with higher concentration of fluorescent compound in the polymer. UW/VIS (Millipore water) $\lambda$max 367 nm (vs 365 nm for fluorescent compound only used in PFC-B in $CH_2Cl_2$/TFA). Fluorescent emission (Millipore water) $\lambda^{em}$max 405, 429 nm (vs $\lambda^{em}$max 386, 412 nm for fluorescent compound only used in PFC-B when excited at 367 nm).

The pellets of the three polymeric fluorescent compounds described above (PFC-A to C) were used for preparing aqueous dispersions. Water was heated to from 70 to 90° C. and pellets were slowly added to hot water under constant agitation. A clear water dispersion of the polymeric fluorescent compounds with particle size in the range of from 20 to 30 nm was obtained by stirring at about 70° C. to 90° C. for from 30 to 60 minutes. These dispersions of polymerized fluorescent compounds were used in preparing waterborne acrylic polymer (e.g. dispersion or latex) described in the Examples set out below.

Example 1

The waterborne acrylic polymer containing polymeric fluorescent compound (PFC-A) was prepared using the following ingredients:

| Ingredients | Amount (g) | % |
|---|---|---|
| Methylmethacrylate (MMA) | 100.0 | 21.77 |
| Butyl Acrylate (BA) | 100.0 | 21.77 |
| PFC-A | 5.0 | 1.09 |

-continued

| Ingredients | Amount (g) | % |
|---|---|---|
| Abex EP-100 | 4.0 | 0.87 |
| Ammonium Persulfate (Intitiator) | 0.4 | 0.09 |
| Water | 250.0 | 54.41 |

The acrylic polymer was prepared as follows:

1. PFC-A was dissolved in water at 80° C. by heating the water to 80° C. and adding PFC-A pellets slowly under mild agitation. A clear dispersion was obtained.
2. The PFC-A dispersion was mixed with an aqueous solution of Abex EP-100 surfactant.
3. A mixture of MMA/BA was added slowly to water during continuous stirring with Ross mixer. The O/W emulsion was formed.
4. The emulsion prepared from step 3 above (about ⅓ part) was poured in a reactor containing a nitrogen gas environment and heated to 70° C. while continuously stirring.
5. At 70° C. an initiator (50 gm of 0.8% ammonium persulfate solution in water) and remaining emulsion was pumped in the reactor using separate pumps over two hours with stirring.
6. After adding remaining emulsion and initiator, the 70° C. temperature was maintained for one additional hour while continuous mixing to complete the polymerization.
7. The acrylic polymer-optical brightener compositions containing polymerized fluorescent compound (PFC-A) was allowed to cool down to room temperature. The material was filtered and stored in a container.

The waterborne acrylic polymer- compositions prepared according to the above procedure were stable, and no settling was observed after several weeks. The compositions were characterized as follows:

| Measured Parameters | Experimental Data |
|---|---|
| % Solid Content | 43.9 |
| Particle Size (μm) | |
| Relative Volume | |
| 10% | 0.12 |
| 50% | 0.14 |
| 90% | 0.17 |
| Sp. Surface Area (square meter/g) | 41.8 |

Example 2

The procedure described above for Example 1 was repeated with the exception that the amount of polymeric fluorescent compound A (PFC-A) utilized was 7.50 g. instead of 5.0 g. The process used to prepare acrylic polymer-optical brightener compositions the same as described in Example 1.

The waterborne acrylic polymer-optical brightener compositions were stable, and no settling was observed after several weeks. The compositions were characterized as follows:

| Measured Parameters | Experimental Data |
| --- | --- |
| % Solid Content | 41.00 |
| Particle Size (Mw) | |
| 10% | 0.098 |
| 50% | 0.141 |
| 90% | 0.199 |
| Specific surface area (square meter/g) | 44.2 |

Example 3

Example 1 was repeated with the exception that the amount of PFC-A utilized was 10 g, instead of 5 g for preparing the acrylic polymer-optical brightener compositions of the invention. The process used to prepare acrylic polymer-optical brightener compositions was the same as described in Example 1 above.

The waterborne acrylic polymer-optical brightener compositions were stable, and no settling was observed after several weeks. The compositions were characterized as follows:

| Measured Parameters | Experimental Data |
| --- | --- |
| % Solid Content | 43.44 |
| Particle Size (Mw) | |
| 10% | 0.095 |
| 50% | 0.132 |
| 90% | 0.172 |
| Specific surface area (square meter/g) | 47.4 |

Example 4 (Comparative)

Example 1 was repeated with the exception that no polymeric fluorescent compound was used in preparing waterborne acrylic polymer. The process used for preparing the waterborne acrylic polymer-optical brightener compositions the same as described in Example 1.

The waterborne acrylic polymer-optical brightener compositions were stable, and no settling was observed after several weeks. The compositions were characterized as follows:

| Measured Parameters | Experimental Data |
| --- | --- |
| % Solid Content | 42.17 |
| Particle Size (Mw) | |
| 10% | 0.12 |
| 50% | 0.16 |
| 90% | 0.20 |
| Specific surface area (square meter/g) | 38.2 |

Example 5

Example 1 was repeated with the exception that the 2.0 g PFC-B was used instead of PFC-A in preparing waterborne acrylic polymers containing polymeric fluorescent compounds. The process used for preparing acrylic polymer-optical brightener compositions the same as described in Example 1.

The waterborne acrylic polymer-optical brightener compositions were stable, and no settling was observed after several weeks. The compositions were characterized as follows:

| Measured Parameters | Experimental Data |
| --- | --- |
| % Solid Content | 42.59 |
| Particle Size (Mw) | |
| 10% | 0.13 |
| 50% | 0.16 |
| 90% | 0.20 |
| Specific surface area (square meter/g) | 67.0 |

Example 6

Example 5 was repeated with the exception that the amount of PFC-B incorporated was 7.0 g instead of 2.0 g in preparing waterborne acrylic polymer containing fluorescent compound. The process used for preparing acrylic polymer-optical brightener compositions the same as described in Example 1.

The waterborne acrylic polymer-optical brightener compositions were stable, and no settling was observed after several weeks. The compositions were characterized as follows:

| Measured Parameters | Experimental Data |
| --- | --- |
| % Solid Content | 44.38 |
| Particle Size (Mw) | |
| 10% | 0.07 |
| 50% | 0.11 |
| 90% | 0.16 |
| Specific surface area (square meter/g) | 59.1 |

Example 7

Example 5 was repeated with the exception that the amount of PFC-B incorporated was 3.0 g (5.0 wt % PFC-B in polyester) instead of 2.0 g (10.0 wt % PFC-B in polyester) in preparing waterborne acrylic polymer containing polymeric fluorescent compound. The PFC-B contained 5.0 wt % fluorescent compound. The process used for preparing acrylic polymer-optical brightener compositions the same as described in Example 1.

The waterborne acrylic polymer-optical brightener compositions were stable, and no settling was observed after several weeks. The compositions were characterized as follows:

| Measured Parameters | Experimental Data |
| --- | --- |
| % Solid Content | 35.77 |
| Particle Size (Mw) | |
| 10% | 0.11 |
| 50% | 0.15 |
| 90% | 0.19 |
| Specific surface area (square meter/g) | 42.1 |

Example 8

Example 7 was repeated with the exception that the amount of PFC-B incorporated was 7.0 g instead of 3.0 g in preparing waterborne acrylic polymer containing polymeric fluorescent compound. The PFC-B contained 5.0 wt % fluorescent compound. The process used for preparing acrylic polymer-optical brightener compositions the same as described in Example 1.

The waterborne acrylic polymer-optical brightener compositions were stable, and no settling was observed after several weeks. The compositions were characterized as follows:

| Measured Parameters | Experimental Data |
|---|---|
| % Solid Content | 38.42 |
| Particle Size (Mw) | |
| 10% | 0.05 |
| 50% | 0.07 |
| 90% | 0.11 |
| Specific surface area (square meter/g) | 87.2 |

Example 9

The waterborne acrylic polymer-optical brightener compositions from Examples 1 and 4 were used to form a film on paper with number 3 Meyer rod. The films were formed using the aqueous dispersions with and without PFC-A. These films were completely dried at room temperature. The dried films were analyzed by FMC-II method for b-values (yellowness to blueness) using ACS Applied Color System. The b-value for the film composed of acrylic polymer containing PFC-A was −2.23 (bluer) compared to the acrylic polymer film without the polymeric optical brightener.

Example 10

Example 9 was repeated with the exception that the waterborne acrylic polymer-optical brightener compositions containing PFC-B from Example 8 were used instead of waterborne acrylic polymer containing PFC-A from Example 1. A number 3 Meyer rod was used to form the films on paper. These films were dried completely at room temperature. The dried films were analyzed by FMC-II method for b-values (yellowness to blueness) using ACS Applied Color System. The b-value for the film composed of acrylic polymer containing PFC-B was −2.35 (bluer) compared to the acrylic polymer film without polymeric optical brightener.

Example 11

Example 9 was repeated with the exception that the polymer films were formed on metal panel instead of paper using the number 6 Meyer rod. These films were completely dried at room temperature. The dried films were analyzed by FMC-II method for b-values (yellowness to blueness) using ACS Applied Color System. The b-value for the film composed of acrylic polymer containing PFC-A was −2.58 (bluer) compared to the acrylic polymer film without polymeric optical brightener.

Example 12

Example 11 was repeated with the exception that the waterborne acrylic polymer-optical brightener compositions containing PFC-B from Example 8 were used instead of waterborne acrylic polymer containing PFC-A from Example 1. A number 6 Meyer rod was used to form the films on a metal panel. These films were completely dried at room temperature. The dried films were analyzed by FMC-II method for b-values (yellowness to blueness) using ACS Applied Color System. The b-value for the film composed of acrylic polymer containing PFC-B was −1.85 (bluer) compared to the acrylic polymer film without polymeric optical brightener.

The invention has been described in detail with particular reference to preferred embodiments thereof, but it will be understood that variations and modifications can be effected without departing from the scope and spirit of the invention.

Throughout this application, where publications are referenced, the disclosures of these publications in their entireties are hereby incorporated by reference into this application in order to more fully describe the state of the art to which this invention pertains.

What is claimed is:

1. An acrylic polymer composition having an optical brightener agent wherein the composition comprises:
   c) a first polymer comprising repeat units of a monomer having the formula $CH_2=CR^A-C(O)OR^B$, wherein $R^A$ and $R^B$ are each, independently, a $C_1$ to $C_8$ straight or branched alkyl group and wherein $R^A$ can be hydrogen; and
   d) a polymeric fluorescent compound, wherein the polymeric fluorescent compound comprises repeat units of residues of:
      i) a monomer comprising a dicarboxylic acid or ester;
      ii) a monomer comprising a diol, a diamine or a mixture thereof;
      iii) a monomer comprising at least one sulfonate group and at least one polyester reactive group; and
      iv) a monomer comprising an optical brightener agent having at least one polyester reactive group.

2. The composition of claim 1 wherein the first polymer comprises repeat units of a monomer selected from the group consisting of: styrene; methyl styrene; methyl acrylate; methylmethacrylate; ethyl acrylate; butylacrylate; butylmethacrylate; ethylhexylacrylate; 2-hydroxyethyl acrylate; hydroxylethylmethacrylate; acrylic acid; acrylamide; maleic anhydride; and acrylonitrile.

3. The composition of claim 1 wherein the first polymer comprises repeat units of a methylmethacrylate monomer.

4. The composition of claim 1 further comprising a surfactant.

5. The composition of claim 4 wherein the surfactant has a hydrophilic-lipophilic balance of greater than or equal to about 7.0.

6. The composition of claim 4, wherein the surfactant has a molecular weight of less than or equal to about 1000.

7. The composition of claim 4 wherein the surfactant comprises sodium lauryl sulfate; sodium octylphenol glycolether sulfate; sodium dodecylbenzene sulfonate; sodium lauryldiglycol sulfate; ammonium tritertiarybutyl phenol and penta- glycol sulfonate; octa-glycol sulfonate; half ester of sulfosuccinic acid; disodium n-octyldecyl sulfosuccinate; sodium dioctyl sulfosuccinate; or a mixture thereof.

8. The composition of claim 4 wherein the surfactant comprises a surface active monomer.

9. The composition of claim 4 wherein the surfactant is present in the amount of from about 0.01% to about 5.0 wt. % based upon the total weight of the acrylic polymer-optical brightener composition.

10. The composition of claim 4 wherein the surfactant is present in the amount of from about 0.05 to about 1.0 wt. % based upon the total weight of the acrylic polymer-optical brightener composition.

11. The composition of claim 1 wherein the polymeric fluorescent compound comprises a polyester polymer of repeat units of residues of dimethyl isophthalate; dimethyl 5-sodiosulfoisophthalate; diethylene glycol; 1,4-cyclohexanedimethanol; 2,5-bis-(4'-carbomethoxystyryl-phenyl)-1,2,4-oxadiazole; or a mixture thereof.

12. The composition of claim 1 further comprising an initiator.

13. The composition of claim 12 wherein the initiator comprises ammonium persulfate; potassium persulfate; hydrogen peroxide; dibenzoyl peroxide; lauryl peroxide; ditertiary butyl peroxide; 2,2'-azobisisobutyronitrile; t-butylperoxide; t-butyl hydroperoxide; benzoyl peroxide; sodium formaldehyde sulfoxylate; or a mixture thereof.

14. The composition of claim 12 wherein the initiator comprises ammonium persulfate.

15. The composition of claim 1 further comprising water in the range of from about 30 to about 90 percent by weight of the acrylic polymer composition.

16. The composition of claim 1 wherein the dicarboxylic acid comprises succinic acid; glutaric acid; adipic acid; azelaic acid; sebacic acid; 1,4-cyclohexanedicarboxylic acid; phthalic acid; terephthalic acid; isophthalic acid; 2,6-naphthalenedicarboxylic acid; dimethyl terephthalate; cyclohexanediacetic acid; diphenyl-4,4'-dicarboxylic acid; fumaric acid; 2,7-naphthalene di-carboxylic acid; resorcino-ldiacetic acid; diglycolic acid; 4,4'-oxybis(benzoic) acid; biphenyldicarboxylic acid; 1,12-dodecanedicarboxylic acid; 4,4'-sulfonyldibenzoic acid; 4,4'-methylenedibenzoic acid; trans-4,4'stilbenedicarboxylic acid or a mixture thereof.

17. The composition of claim 1 wherein the dicarboxylic acid comprises terephthalic acid.

18. The composition of claim 1 wherein the dicarboxylic ester comprises dimethyl ester of 1,4-cyclohexanedicarboxylic acid; dimethylester of isophthalic acid; or a mixture thereof.

19. The composition of claim 1 wherein the diol comprises ethylene glycol; diethylene glycol; propylene glycol; 1,3-propanediol; triethylene glycol; 2,4-dimethyl-2-ethylhexane-1,3-diol; 2,2,-dimethyl- 1,3-propanediol; 1,3-butanediol; 1,4-butanediol; 1,5-pentanediol; 1,6-hexanediol; thiodiethanol; 2-methyl-propane-1,3-diol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol; 2-methyl-1,3-propanediol; 1,10-decanediol; 3-methyl-2,4-pentanediol; 2-methyl-1,4-pentanediol; 2,2,4-trimethyl-1,3-pentane-diol; 2-ethyl-1,3-hexanediol; 2,2-diethyl- 1,3-propane-diol; 1,3-hexanediol; 1,4-di-(hydroxyethoxy)-benzene; 2,2-bis-(4-hydroxycyclohexyl)-propane; 2,4-dihydroxy-1,1,3,3-tetramethyl-cyclobutane; 2,2-bis-(3-hydroxyethoxy phenyl)-propane; 2,2-bis-(4-hydroxy-propoxyphenyl)-propane; or a mixture thereof.

20. The composition of claim 1 wherein the diol is present in the polymeric fluorescent compound in the amount of from about 25 to about 50 parts by weight of the polymeric fluorescent compound.

21. The composition of claim 1 wherein the diamine comprises 1,6-hexamethylenediamine; 1,6-cyclohexanedimethylamine; 1,3-diaminomethylbenzene; 2,2-dimethyl-1,3-propanediamine; ($H_2NCH_2CH_2$(OCH$_2$CH$_2$))$_v$OCH$_2$CH$_2$NH$_2$; wherein v is an integer of from 1 to 20; or a mixture thereof.

22. The composition of claim 1 wherein the amount of diamine is from about greater than 1 to about 50 parts by weight of the polymeric fluorescent compound wherein the sum of components i) to iv) is equal to 100 parts.

23. The composition of claim 1 wherein the sulfonate-containing monomer is a dicarboxylic acid or an ester thereof comprising a sulfonate group; a glycol comprising a sulfonate group; a hydroxy acid containing a sulfonate group; or a mixture thereof.

24. The composition of claim 23 wherein the sulfonate group is attached to an aromatic group.

25. The sulfonate group of claim 24, wherein the aromatic group is benzene; naphthalene; diphenyl; oxydiphenyl; sulfonyldiphenyl; or a methylenediphenyl nucleus.

26. The composition of claim 24 wherein the sulfonate group comprises a metal ion selected from the group consisting of an alkali earth metal; alkaline earth metal; a transition metal; a lathanide; or an actinide.

27. The composition of claim 24 wherein the sulfonate group comprises a metal ion selected from the group consisting of sodium; lithium; potassium; or a mixture thereof.

28. The composition of claim 1 wherein component (iii) comprises sulfophthalic acid; sulfoterephthalic acid; sulfoisophthalic acid; 4-sulfonaphthalene-2,7-dicarboxylic acid; 5-sulfoisophthalic acid; a salt or ester thereof; or a mixture thereof.

29. The composition of claim 1 wherein the sulfonate-containing monomer is 5-sodiosulfoisophthalic acid and the diol component comprises ethylene glycol; 1,4 cyclohexane dimethanol; diethylene glycol; or a mixture thereof.

30. The composition of claim 1 wherein the amount of sulfonate-containing monomer is from about 5 to about 65 parts by weight of the polymeric fluorescent compound wherein the sum of components i–iv is equal to 100 parts.

31. The composition of claim 1 wherein the amount of sulfonate-containing monomer is from about 8 to about 30 parts by weight of the polymeric fluorescent compound wherein the sum of components i–iv is equal to 100 parts.

32. The composition of claim 1 wherein the polymeric fluorescent compound is water dispersible.

33. The composition of claim 1 wherein the optical brightener agent is present in the polymeric fluorescent compound in less than or equal to about 2000 ppm.

34. The composition of claim 1 wherein the optical brightener agent is present in the polymeric fluorescent compound at less than or equal to about 1000 ppm.

35. The composition of claim 1 wherein the acrylic polymer composition having an optical brightener agent comprises acrylic polymer particles and the polymeric fluorescent compound is located with the acrylic polymer particles at or near the surface of the particles.

36. The composition of claim 1 wherein the optical brightener agent has the structure:

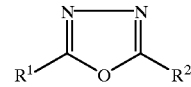

wherein $R^1$ and $R^2$ are, independently, naphthyl; diphenyl; aryl; alkenyl; alkynyl; or heteroaryl; and wherein $R^1$ and $R^2$ are substituted or unsubstituted.

37. The composition of claim 36 wherein $R^1$ and $R^2$ are, independently, both aryl groups and the aryl group has the structure:

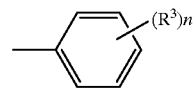

wherein, each $R^3$, independently, comprises an alkyl group; a cycloalkyl group; an aralkyl group; an alkenyl group; an alkynyl group; an alkoxy group; an alkenyloxy group; an alkynyloxy group; a substituted or unsubstituted amino group; a halogen; or a carboxyl group; wherein the carboxyl group comprises a carboxylic acid; an ester; an anhydride; a carbonyl halide; or a carbamide; and n is an integer of from 1 to 5.

38. The composition of claim 37 wherein $R^3$ has the structure:

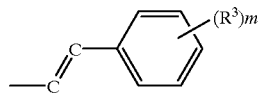

wherein each $R^4$, independently, comprises a polyester reactive group and m is an integer of from 1 to 3.

39. The composition of claim 38 wherein $R^4$ comprises a carboxyl group, wherein the carboxyl group comprises a carboxylic acid; an ester; an anhydride; a carbonyl halide; or a carbamide.

40. The composition of claim 36 wherein $R^1$ and $R^2$, independently, have the structure:

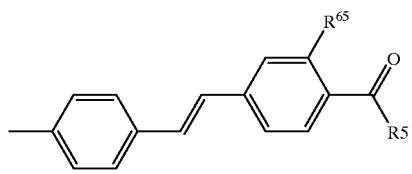

wherein $R^5$ comprises a hydroxyl group; an alkoxy group; an alkoxy hydroxy group; an alkenyloxy group; an alkynyloxy group; an amide; a halide; a carboxyl group or a substituted or unsubstituted amino group; and wherein $R^{65}$ comprises hydrogen; a halide; an alkyl group; or an alkoxy group.

41. The composition of claim 40 wherein $R^5$ is hydroxy; methoxy; ethoxy; butoxy; 2-ethyl-hexyloxy; $NHCH_2CH_2NH_2$; $OCH_2CH_2OH$; fluoro; chloro; bromo; or iodo and $R^{65}$ is hydrogen.

42. The composition of claim 40 wherein $R^5$ is methoxy and $R^{65}$ is chloride; fluoride; methyl; or methoxy.

43. The composition of claim 36 wherein both $R^1$ and $R^2$ are, independently, an alkenyl group; and each alkenyl group, independently, has the structure:

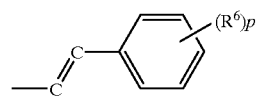

wherein $R^6$ is a polyester reactive group and p is an integer of from 1 to 3.

44. The composition of claim 43 wherein $R^6$ comprises a carboxyl group, and wherein the carboxyl group comprises a carboxylic acid; an ester; an anhydride; a carbonyl halide; or a carbamide.

45. The composition of claim 36 wherein each of $R^1$ and $R^2$, independently, have the structure:

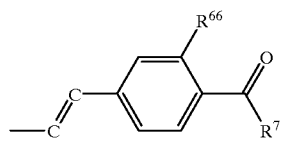

wherein $R^7$ comprises a hydroxyl group; an alkoxy group; an alkoxy hydroxy group; an alkenyloxy group; an alkynyloxy group; an amide; a halide; a carboxyl group or a substituted or unsubstituted amino group; and $R^{66}$ comprises hydrogen; a halide; an alkyl group; or an alkoxy group.

46. The composition of claim 45 wherein $R^7$ is hydroxy; methoxy; ethoxy; butoxy; 2-ethyl-hexyloxy; $NHCH_2CH_2NH_2$; $OCH_2CH_2OH$; fluoro; chloro; bromo; or iodo; and wherein $R^{66}$ is hydrogen.

47. The composition of claim 45 wherein $R^7$ is methoxy and $R^{66}$ is chloride; fluoride; methyl; or methoxy.

48. The composition of claim 1 wherein the optical brightener agent has the structure:

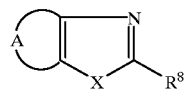

wherein A is the residue of a fused ring;
$R^8$ is naphthyl; diphenyl; aryl; alkenyl; alkynyl or heteroaryl;
wherein $R^8$ is substituted or unsubstituted; X is —O—; —S—; or —N($R^9$);
wherein $R^9$ is hydrogen; alkenyl or an unsubstituted or substituted alkyl; cycloalkyl or aryl; and
wherein at least one polyester reactive group is present in the optical brightener agent.

49. The composition of claim 48 wherein $R^8$ has the structure:

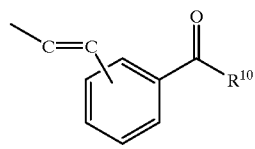

wherein $R^{10}$ is halogen or W—$R^{27}$; wherein W is —O— or —N($R^{28}$); and wherein $R^{27}$ and $R^{28}$ are, independently, hydrogen; alkenyl; or an unsubstituted or substituted alkyl; cycloalkyl; or aryl.

50. The composition of claim 1 wherein the optical brightener agent has the structure:

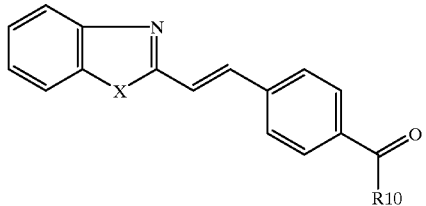

wherein X is —O—; —S—; or —NH—;
and wherein $R^{10}$ is hydroxy; alkoxy; hydroxylalkylamine; or di(hydroxyalkyl)amine.

51. The composition of claim 1 wherein the optical brightener agent has the structure:

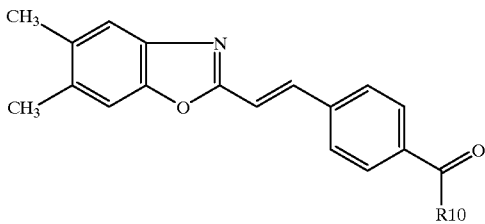

and wherein $R^{10}$ is lower alkoxy; hydroxy; or chloro.

52. The composition of claim 1 wherein the optical brightener agent has the structure:

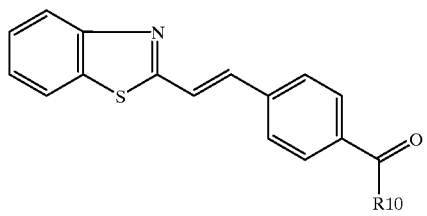

and wherein $R^{10}$ is lower alkoxy; hydroxy; or chloro.

53. The composition of claim 1 wherein the optical brightener agent has the structure:

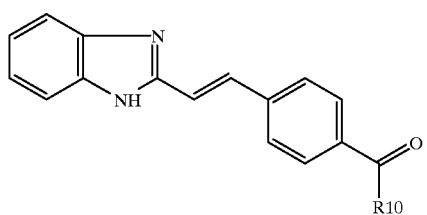

wherein $R^{10}$ is lower alkoxy; hydroxy; or chloro.

54. The composition of claim 1 wherein the optical brightener agent has the structure:

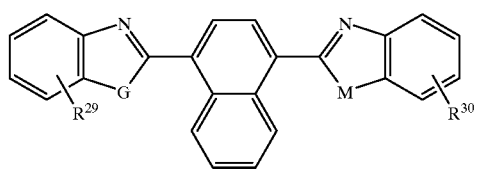

wherein $R^{29}$ is a polyester reactive group;

$R^{30}$ is naphthyl; diphenyl; aryl; alkenyl; alkynyl; heteroaryl or a polyester reactive group; wherein the moiety $R^{30}$ is substituted or unsubstituted; and G and M are each, independently, —O—; —S—; or $NR^{31}$, wherein $R^{31}$ is branched or straight chain $C_1$–$C_{12}$.

55. The composition of claim 1 wherein the optical brightener agent has the structure:

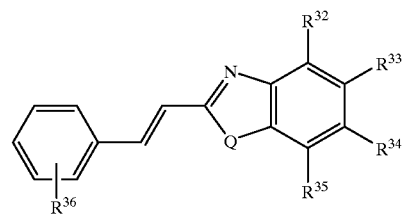

wherein $R^{32}$, $R^{33}$, $R^{34}$ and $R^{35}$ are independently hydrogen; substituted or unsubstituted lower alkyl; cycloalkyl; aryl; lower alkylaryl; alkoxy or a fused ring;

$R^{36}$ is a polyester reactive group; Q is —O—; —S—; or —$NR^{37}$; and wherein $R^{37}$ is branched or straight chain $C_1$–$C_{12}$.

56. The composition of claim 1 wherein the optical brightener agent has the structure:

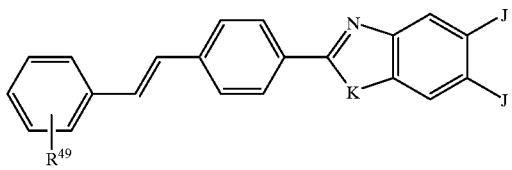

wherein K is —S—; —O—; or $NR^{50}$; wherein $R^{50}$ is $C_1$–$C_4$ branched or straight chain alkyl; wherein $R^{49}$ is a polyester reactive group; and wherein each J is, independently, hydrogen; a cyano group; a nitro group; or a trifluoromethyl group.

57. The composition of claim 1, wherein the optical brightener agent has the structure:

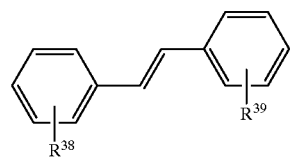

wherein $R^{38}$ is a polyester reactive group; and wherein $R^{39}$ is naphthyl;

diphenyl; aryl; alkenyl; alkynyl; cycloalkylene; heteroaryl or a polyester reactive group; and wherein $R^{39}$ is substituted or unsubstituted.

58. The composition of claim 1 wherein the optical brightener agent is a benzopyran having the structure:

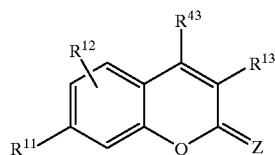

wherein $R^{11}$ is hydroxy; —$OR^{14}$; or —$OC(O)R^{15}$;

wherein $R^{12}$ is hydrogen; alkyl; —$OR^{40}$; or halogen;

wherein $R^{13}$ is cyano; —$C(O)R^{41}$; —$CO_2R^{41}$; carbamoyl; —$C(O)N(R^{42})(R^{41})$; —$SO_2R^{42}$ or a carbocyclic or heterocyclic aryl group;

wherein $R^{43}$ is hydrogen; aryl; alkyl; or —$CH_2CO_2R^{44}$;

wherein $R^{14}$, $R^{40}$ and $R^{42}$ are independently alkenyl; alkyl; cycloalkyl; or aryl;

wherein $R^{15}$, $R^{41}$ and $R^{44}$ are, independently, hydrogen; alkyl; cycloalkyl; or aryl;

wherein $R^{44}$ is alkyl; cycloalkyl; or aryl radical;

wherein Z is oxo or imino; and wherein the benzopyran has at least one polyester reactive group.

59. The composition of claim 1, wherein the optical brightener agent has the structure:

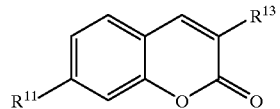

wherein $R^{11}$ is hydroxy; hydroxyalkoxy; alkanoyloxyalkoxy; alkoxycarbonylalkoxy; or alkoxycarbonylphenylalkoxy; wherein $R^{13}$ is alkoxycarbonyl; arylsulfonyl; cyano; 2-benzoxazolyl; 2-benzothiazolyl; 2-benzoxazolyl; or 2-benzimidazolyl; and wherein each alkoxy group of $R^{11}$ and $R^{13}$, independently, has from one to six carbon atoms; and wherein each aryl group, independently, is a phenyl group or a phenyl group substituted with a $C_1$–$C_4$ alkyl group or halogen.

60. The composition of claim 1 wherein the optical brightener agent has the structure;

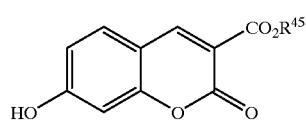

and wherein $R^{45}$ is an alkyl group of from one to six carbon atoms.

61. The composition of claim 1 wherein the optical brightener agent has the structure:

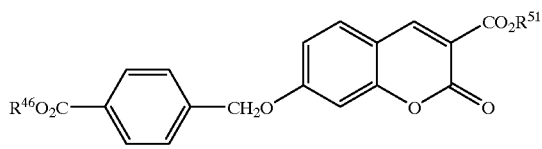

wherein $R^{51}$ and $R^{46}$ are, independently, an alkyl group of from one to six carbon atoms.

62. The composition of claim 1 wherein the optical brightener agent has the structure:

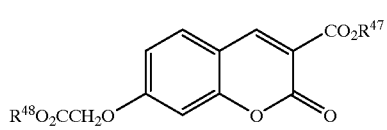

wherein $R^{47}$ and $R^{48}$ are, independently, an alkyl group of from one to six carbon atoms.

63. The composition of claim 1 wherein

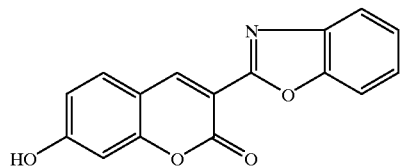

is the structure of the optical brightener agent.

64. The composition of claim 1 wherein the amount of the optical brightener agent is from about 0.00001 to about 30 parts by weight of the polymeric fluorescent compound.

65. The composition of claim 1 wherein the optical brightener compound has at least two polyester reactive groups.

66. The composition of claim 1 wherein the optical brightener-agent comprises a phthalocyanine, a 2,3-naphthalocyanine or a squaraine.

67. The composition of claim 1 wherein the optical brightener agent is a compound having the structure:

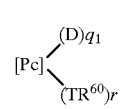

V

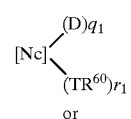

VI or

VII

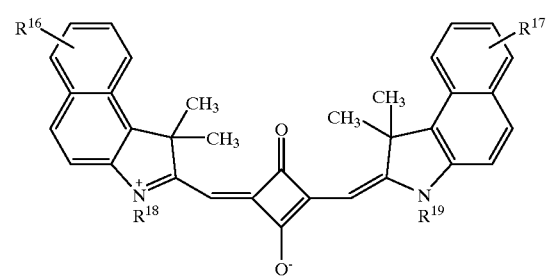

wherein Pc represents a phthalocyanine moiety having the structure VIII and Nc represents a 2,3-naphthalocyanine moiety having the structure IX:

VIII

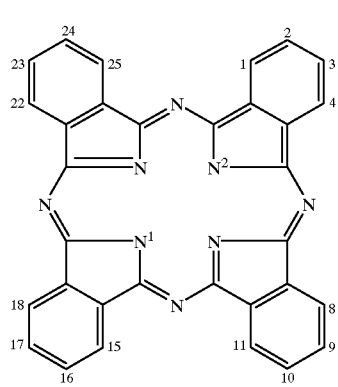

43

-continued

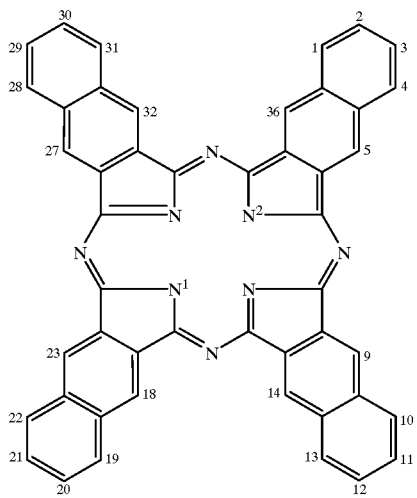

wherein $N^1$ and $N^2$ can, independently, be bonded to hydrogen or to various metals comprising halometals, organometallic groups, and oxymetals comprising AlCl; AlBr; AlF; AlOH; AlOR$^{20}$; Ca; Ge; Ga; InCl; Mg; SiCl$_2$; SiF$_2$; SnCl$_2$; Sn(OR$^{21}$)$_2$; Si(OR$^{21}$)$_2$; Sn(SR$^{21}$)$_2$; Si(SR$^{21}$)$_2$; Sn; or Zn; wherein $R^{20}$ and $R^{21}$ are selected from hydrogen, alkyl, aryl, lower alkanoyl, trifluoroacetyl or groups of the formula:

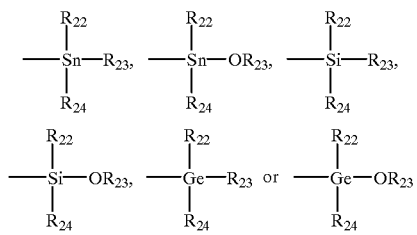

wherein $R^{22}$, $R^{23}$ and $R^{24}$ are, independently, selected from alkyl; phenyl; or phenyl substituted with lower alkyl, lower alkoxy or halogen; wherein T is selected from oxygen; sulfur; selenium; tellurium or a group of the formula —NR$^{25}$, wherein $R^{25}$ is hydrogen; cycloalkyl; alkyl; acyl; alkyl-sulfonyl; or aryl; or wherein $R^{25}$ and $R^{60}$ taken together form an aliphatic or aromatic ring with the nitrogen atom to which they are attached; wherein D is selected from alkyl; aryl; halogen or hydrogen; wherein $R^{60}$ is selected from unsubstituted or substituted alkyl; alkenyl; alkynyl; $C_3$–$C_8$ cycloalkyl; aryl; heteroaryl;

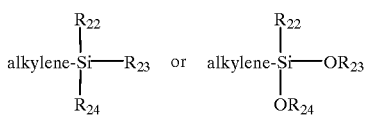

wherein —(TR$^6$)$_r$ is alkylsulfonylamino; arylsulfonylamino; or a group selected from the formula —C(C$_2$H$_4$O)$_e$R$^{26}$,

44

IX
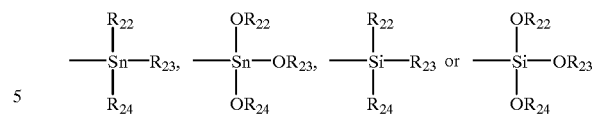

wherein $R^{26}$ is hydrogen or $R^{60}$ as defined above; e is an integer of from 1–4; or two —(TR$^{60}$)$_r$ groups can be taken together to form divalent substituents of the formula

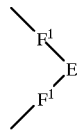

wherein each $F^1$ is, independently, —O—, —S—, or —N—R$^{25}$;
and wherein E comprises an alkyl group comprising ethylene, propylene or trimethylene, wherein the alkyl group is substituted with $C_1$–$C_4$ alkyl; $C_1$–$C_4$ alkoxy; aryl; cycloalkyl; 1,2-phenylene; and 1,2-phenylene containing from 1 to 3 substituents selected from $C_1$–$C_4$ alkyl, $C_1$–$C_4$ alkoxy or halogen; wherein $R^{16}$ and $R^{17}$ are independently selected from hydrogen, lower alkyl, lower alkoxy, halogen; aryloxy; lower alkylthio; arylthio; lower alkylsulfonyl; arylsulfonyl; lower alkylsulfonyl amino; arylsulfonylamino; cycloalkylsulfonylamino; carboxy; unsubstituted and substituted carbamoyl and sulfamoyl; lower alkoxycarbonyl; hydroxy; lower alkanoyloxy;

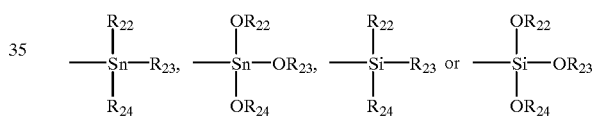

wherein $R^{18}$ and $R^{19}$ are independently hydrogen, lower alkyl, alkenyl or aryl;
wherein q is an integer from 0 to 12 and r is an integer from 4 to 16 provided that the sum of q and r is 16 and at least one polyester reactive group is present, and
wherein $q_1$ is an integer from 0 to 24 and $r_1$ is an integer from 0 to 16, provided that the sum of $q_1$ and $r_1$ is 24 and at least one polyester reactive group is present.

68. The composition of claim 67 wherein the optical brightener agent is a squaraine compound having the structure VI; wherein $R^{16}$ and $R^{17}$ are, independently, carboxy or lower alkoxycarbonyl.

69. The composition of claim 67 wherein the optical brightener agent is a 2,3-naphthalocyanine compound having the structure VI; wherein D is hydrogen; q1 is 24; r1 is 24; and r1 is 0.

70. The composition of claim 67 wherein the optical brightener agent is a 2,3-naphthalocyanine compound having structure VI, wherein the naphthalocyanine moiety is bonded to SiCl$_2$; Si(OH)$_2$; or Si(OR$^{21}$)$_2$.

71. The composition of claim 67 wherein the optical brightener agent is a phthalocyanine compound having the structure V; wherein T is oxygen; R is aryl; D is hydrogen; r is 4; and q is 12; and wherein the phthalocyanine moiety is bonded to AlCl; AlOH; ALOC(O)CF$_3$; ALOR$^{20}$; SiCl$_2$; Si(OH)$_2$; Si(OR$^{21}$)$_2$; GaCl; GaOH; GaOC(O)CF$_3$; GaOR$^{20}$; InCl; InOH; InOCOCF$_3$; InOR$^{20}$; magnesium; zinc; or hydrogen.

72. The composition of claim 1 further comprising a polymeric near infrared absorbing compound wherein the polymeric near infrared absorbing compound comprises repeat units of residues of:

i) a monomer comprising a dicarboxylic acid or ester;

ii) a monomer comprising a diol; a diamine; or a mixture thereof;

iii) a monomer comprising at least one sulfonate group and at least one polyester reactive group; and iv) a monomer comprising a near infrared absorbing compound having at least one polyester reactive group.

73. The composition of claim 1 further comprising a monomer comprising a near infrared absorbing compound having at least one polyester reactive group, wherein the monomer is copolymerized with components i)–iv).

74. The composition of claim 1 wherein the near infrared absorbing compound is a compound having the structure:

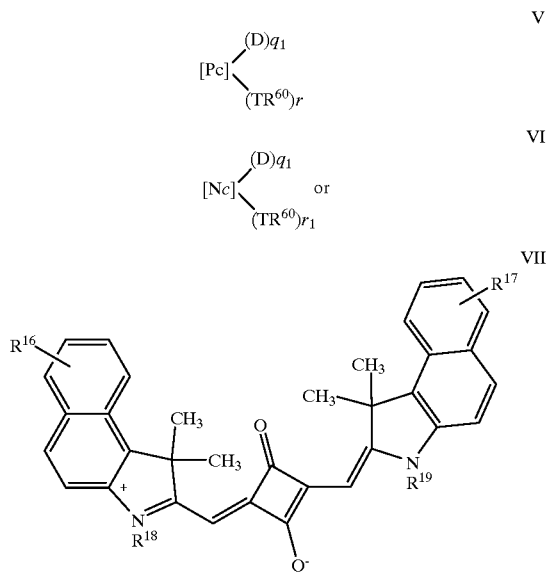

wherein Pc represents a phthalocyanine moiety having the structure VIII and Nc represents a 2,3-naphthalocyanine moiety having the structure IX:

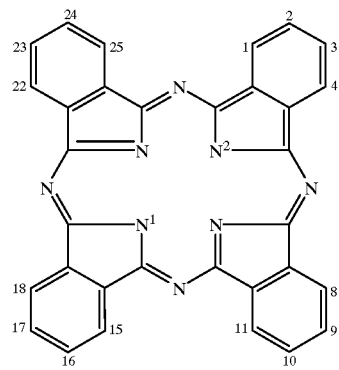

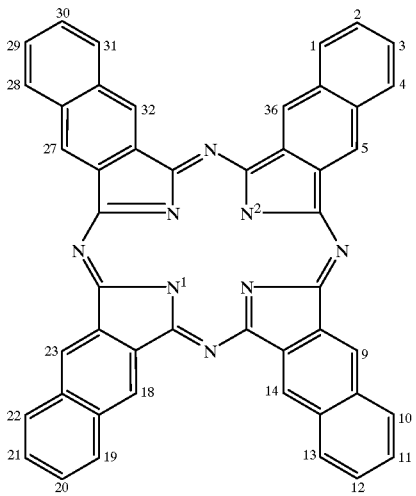

wherein $N^1$ and $N^2$ can, independently, be bonded to hydrogen or to various metals comprising halometals, organometallic groups, and oxymetals comprising AlCl; AlBr; AlF; AlOH; AlOR$^{20}$; Ca; Ge; Ga; InCl; Mg; SiCl$_2$; SiF$_2$; SnCl$_2$; Sn(OR$^{21}$)$_2$; Si(OR$^{21}$)$_2$; Sn(SR$^{21}$)$_2$; Si(SR$^{21}$)$_2$; Sn; or Zn; wherein R$^{20}$ and R$^{21}$ are selected from hydrogen, alkyl, aryl, lower alkanoyl, trifluoroacetyl or groups of the formula:

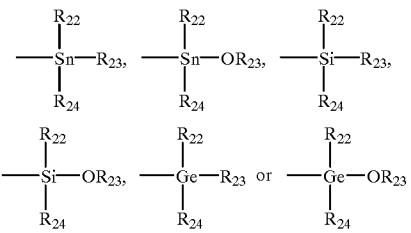

wherein $R^{22}$, $R^{23}$ and $R^{24}$ are, independently, selected from alkyl; phenyl; or phenyl substituted with lower alkyl, lower alkoxy or halogen; wherein T is selected from oxygen; sulfur; selenium; tellurium or a group of the formula —NR$^{25}$, wherein R$^{25}$ is hydrogen; cycloalkyl; alkyl; acyl; alkyl-sulfonyl; or aryl;

or wherein R$^{25}$ and R$^{60}$ taken together form an aliphatic or aromatic ring with the nitrogen atom to which they are attached; wherein D is selected from alkyl; aryl; halogen or hydrogen; wherein R$^{60}$ is selected from unsubstituted or substituted alkyl; alkenyl; alkynyl; C$_3$–C$_8$ cycloalkyl; aryl; heteroaryl;

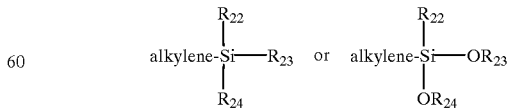

wherein —(TR$^{60}$)$_r$ is alkylsulfonylamino; arylsulfonylamino; or a group selected from the formula —C(C$_2$H$_4$O)$_e$R$^{26}$,

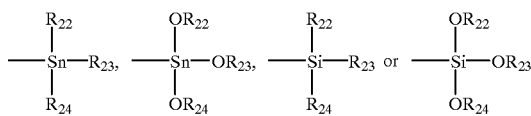

wherein $R^{26}$ is hydrogen or $R^{60}$ as defined above; e is an integer of from 1–4; or two —$(TR^{60})_r$ groups can be taken together to form divalent substituents of the formula

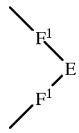

wherein each $F^1$ is, independently, —O—, —S—, or —N—$R^{25}$; and wherein E comprises an alkyl group comprising ethylene, propylene or trimethylene, wherein the alkyl group is substituted with $C_1$–$C_4$ alkyl; $C_1$–$C_4$ alkoxy; aryl; cycloalkyl; 1,2-phenylene; and 1,2-phenylene containing from 1 to 3 substituents selected from $C_1$–$C_4$ alkyl, $C_1$–$C_4$ alkoxy or halogen; wherein $R^{16}$ and $R^{17}$ are independently selected from hydrogen, lower alkyl, lower alkoxy, halogen; aryloxy; lower alkylthio; arylthio; lower alkylsulfonyl; arylsulfonyl; lower alkylsulfonylamino; arylsulfonylamino; cycloalkylsulfonylamino; carboxy; unsubstituted and substituted carbamoyl and sulfamoyl; lower alkoxycarbonyl; hydroxy; lower alkanoyloxy;

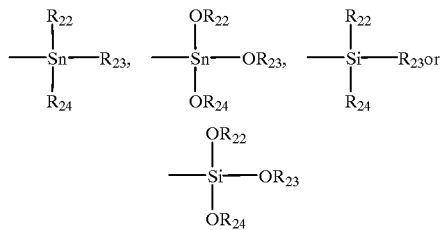

wherein $R^{18}$ and $R^{19}$ are independently hydrogen, lower alkyl, alkenyl or aryl;

wherein q is an integer from 0 to 12 and r is an integer from 4 to 16 provided that the sum of q and r is 16 and at least one polyester reactive group is present, and wherein $q_1$ is an integer from 0 to 24 and $r_1$ is an integer from 0 to 16, provided that the sum of $q_1$ and $r_1$ is 24 and at least one polyester reactive group is present.

75. The composition of claim 74 wherein the near infrared absorbing compound is a squaraine compound having the structure VI, wherein $R^{16}$ and $R^{17}$ are, independently, carboxy or lower alkoxycarbonyl.

76. The composition of claim 74 wherein the near infrared absorbing compound is a 2,3-naphthalocyanine compound having the structure VI, wherein D is hydrogen; q1 is 24; r1 is 24; and r1 is 0.

77. The composition of claim 74 wherein the near infrared absorbing compound is a 2,3-naphthalocyanine compound having structure VI, wherein the naphthalocyanine moiety is bonded to $SiCl_2$; $Si(OH)_2$; or $Si(OR^{21})_2$.

78. The composition of claim 74 wherein the near infrared absorbing compound is a phthalocyanine compound having the structure V, wherein T is oxygen; R is aryl; D is hydrogen; r is 4; and q is 12; and wherein the phthalocyanine moiety is bonded to AlCl; AlOH; ALOC(O)$CF_3$; AL$OR^{20}$; $SiCl_2$; $Si(OH)_2$; $Si(OR^{21})_2$; GaCl; GaOH; GaOC(O)$CF_3$; Ga$OR^{20}$; InCl; InOH; InOCO$CF_3$; In$OR^{20}$; magnesium; zinc; or hydrogen.

79. An acrylic polymer composition having an near infrared absorbing compound wherein the composition comprises:
(a) a first polymer comprising repeat units of a monomer having the formula $CH_2=CR^A$—$C(O)OR^B$, wherein $R^A$ and $R^B$ are each, independently, a $C_1$ to $C_8$ straight or branched alkyl group and wherein $R^A$ can be hydrogen; and
(b) a polymeric near infrared absorbing compound, wherein the polymeric near infrared absorbing compound comprises repeat units of residues of:
 i) a monomer comprising a dicarboxylic acid or ester;
 (ii) a monomer comprising a diol, a diamine or a mixture thereof;
 (iii) a monomer comprising at least one sulfonate group and at least one polyester reactive group; and
 (iv) a monomer comprising an near infrared absorbing compound having at least one polyester reactive group,
wherein the acrylic polymer composition having a near infrared absorbing compound optical brightener agent comprises acrylic polymer particles and the polymeric near infrared absorbing compound is incorporated within the acrylic polymer particles at or near the surface of the acrylic polymer particles.

80. The composition of claim 79 wherein the first polymer comprises repeat units of a monomer selected from the group consisting of: styrene; -methyl styrene; methyl acrylate; methylmethacrylate; ethyl acrylate; butylacrylate; butylmethacrylate; ethylhexylacrylate; 2-hydroxyethyl acrylate; hydroxylethylmethacrylate; acrylic acid; acrylamide; maleic anhydride; acrylonitrile and any derivatives thereof.

81. The composition of claim 79 wherein the first polymer comprises repeat unity of a methylmethacrylate monomer.

82. The composition of claim 79 further comprising a surfactant wherein the surfactant comprises sodium lauryl sulfate; sodium octylphenol glycolether sulfate; sodium dodecylbenzene sulfonate; sodium lauryldiglycol sulfate; and ammonium tritertiarybutyl phenol and penta- glycol sulfonate; octa-glycol sulfonate; sulfosuccinate salts such as disodium ethoxylated nonylphenol half ester of sulfosuccinic acid; disodium n-octyldecyl sulfosuccinate; sodium dioctyl sulfosuccinate; or a mixture thereof.

83. The composition of claim 82 wherein the surfactant comprises a surface active monomer.

84. The composition of claim 82 wherein the surfactant is present in the amount of from about 0.01% to about 5.0 wt. % based upon the total weight of the acrylic polymer-near infrared absorbing composition.

85. The composition of claim 79 wherein the polymeric near infrared absorbing compound comprises a polyester polymer of the repeat units of residues of dimethyl isophthalate; dimethyl 5-sodiosulfoisophthalate; diethylene glycol; 1,4-cyclohexanedimethanol; 2,5-bis-(4'-carbomethoxystyryl-phenyl)-1,2,4-oxadiazole or a mixture thereof.

86. The composition of claim 79 further comprising an initiator wherein the initiator comprises ammonium persulfate; potassium persulfate; hydrogen peroxide; dibenzoyl peroxide; lauryl peroxide; ditertiary butyl peroxide; 2,2'-azobisisobutyronitrile; t-butylperoxide; t-butyl hydroperoxide; benzoyl peroxide; sodium formaldehyde sulfoxylate; or a mixture thereof.

87. The composition of claim 79 further comprising water in the range of from about 30 to about 90 percent by weight of the acrylic polymer composition.

88. The composition of claim 79 wherein the diol is present in the polymeric near infrared absorbing compound in the amount of from about 25 to about 50 parts by weight of the polymeric near infrared absorbing compound.

89. The composition of claim 79 wherein the amount of diamine is from about 0 to about 50 parts by weight of the polymeric near infrared absorbing compound wherein the sum of components i) to iv) is equal to 100 parts.

90. The composition of claim 79 wherein the amount of sulfonate-containing monomer is from about 5 to about 65 parts by weight of the polymeric near infrared absorbing compound wherein the sum of components i–iv is equal to 100 parts.

91. The composition of claim 79 wherein the polymeric near infrared absorbing compound is water dispersible.

92. The composition of claim 79 wherein the near infrared absorbing compound is present in the polymeric near infrared absorbing compound at less thank or equal to about 2000 ppm.

93. The composition of claim 79 wherein the near infrared absorbing compound is present in the polymeric near infrared absorbing compound at less than or equal to about 1000 ppm.

94. A process for preparing a composition comprising a waterborne acrylic polymer and a polymeric fluorescent compound wherein the process comprises:
   a) dispersing about 0.1 to about 50.0% by weight of a polymeric fluorescent compound;
   b) mixing the dispersion with at least one acrylic monomer having the formula $CH_2=CR^A-C(O)OR^B$, wherein $R^A$ and $R^B$ are each, independently, a $C_1$ to $C_8$ straight or branched alkyl group and wherein $R^A$ can be hydrogen; and
   c) polymerizing the acrylic monomer.

95. The process of claim 94 comprising emulsifying the material from steps a) and b) prior to polymerizing the acrylic monomer.

96. The process of claim 94 wherein the waterborne acrylic polymer composition has a solids content of from about 20 to about 60 weight percent.

97. The process of claim 94 wherein the polymeric fluorescent compound is dispersed in water at from about 60 to about 95° C.

98. The process of claim 94 wherein the polymerization step takes place in a reactor heated at from about 40 to about 95° C. for about 1 to about 6 hours.

99. The process of claim 94 wherein the polymeric fluorescent compound comprises repeat units of residues of:
   a) a monomer comprising a dicarboxylic acid or ester;
   b) a monomer comprising a diol; a diamine; or a mixture thereof;
   c) a monomer comprising at least one sulfonate group and at least one polyester reactive group; and
   d) monomer comprising an optical brightener agent having at least one polyester reactive group.

100. The process of claim 94 further comprising a monomer comprising a near infrared absorbing compound having at least one polyester reactive group, wherein the monomer is copolymerized with components a)–d).

101. A process for preparing a composition comprising a waterborne acrylic polymer and a polymeric near infrared absorbing agent wherein the process comprises:
   d) dispersing about 0.1 to about 50.0% by weight of a polymeric near infrared absorbing agent;
   e) mixing the dispersion with at least one acrylic monomer having the formula $CH_2=CR^A-C(O)OR^B$, wherein $R^A$ and $R^B$ are each, independently, $C_1$ to $C_8$ straight or branched alkyl groups and wherein $R^A$ can be hydrogen; and
   f) polymerizing the acrylic monomer
wherein the composition comprises acrylic polymer particles and the polymeric near infrared absorbing compound is located within the acrylic polymer particles at or near the surface of the acrylic polymer particles.

102. The process of claim 101 comprising emulsifying the material from steps a) and b) prior to polymerizing the acrylic monomer.

103. The process of claim 101 wherein the polymeric near infrared absorbing agent comprises repeat units of residues of:
   a) a monomer comprising a dicarboxylic acid or ester;
   b) a monomer comprising a diol, a diamine or a mixture thereof;
   c) a monomer comprising at least one sulfonate group and at least one polyester reactive group; and
   d) monomer comprising a near infrared absorbing compound having at least one polyester reactive group.

104. An article contacted with the composition of claim 1.

105. A method for distinguishing a fluorescing article from a non-fluorescing article comprising:
   a) exposing the article of claim 104 to ultraviolet radiation; and
   b) detecting an emitted blue visible light from the irradiated article via blue visible light detection means.

106. The method of claim 105 wherein the fluorescing article is separated from a non-fluorescing article.

107. The method of claim 105 wherein the ultraviolet radiation is in the range from about 220 to about 400 nm.

108. The method of claim 105 wherein the ultraviolet radiation is in the range of from about 280 to about 380 nm.

109. A method for distinguishing a fluorescing article from a non-fluorescing article comprising:
   a) exposing the article of claim 104 to ultraviolet radiation, near-infrared radiation, or both; and
   b) detecting an emitted blue visible light, a near-infrared or fluorescent light, or a mixture thereof from the irradiated article via a blue visible, near-infrared or fluorescence detection means.

110. The method of claim 109 wherein the fluorescing article is separated from a non-fluorescing article.

111. The method of claim 109 wherein the article is exposed to and detected for an emitted ultraviolet radiation.

112. The method of claim 109 wherein the article is exposed to and detected for near-infrared radiation.

113. The method of claim 109 wherein the article is exposed to and detected for blue visible radiation and near-infrared-radiation.

114. The method of claim 109 wherein the ultraviolet radiation is from about 220 to about 400 nm.

115. The method of claim 109 wherein the near-infrared radiation is from about 640 to about 1100 nm.

116. The method of claim 109 wherein the near-infrared radiation is from about 640 to about 950 nm.

117. A method for detecting and separating a fluorescing article from a non-fluorescing article comprising:
   a) exposing the article of claim 104 to blue visible, near-infrared radiation or both to provide a fluorescing and a non-fluorescing article; and
   b) detecting an emitted blue visible, a near-infrared light, or both from the irradiated article via blue visible, near-infrared or fluorescence detection means.

118. The method of claim 117 wherein the fluorescing article is separated from a non-fluorescing article.

119. The method of claim 117 wherein the article is exposed to ultraviolet radiation and detected for blue visible fluorescence radiation.

120. The method of claim 117 wherein the article is exposed to near-infrared radiation and detected for near-infrared or fluorescent radiation.

121. The method of claim 117 wherein the article is exposed to and detected for blue visible fluorescence radiation and near-infrared radiation.

122. A method for enhancing or improving the optical brightness of an article or composition comprising contacting the article or composition with the composition of claim 1.

123. The method of claim 122 wherein the composition to be enhanced or improved is an ink, coating or paint.

124. The method of claim 122 wherein the article is a container, paper, film, fiber, or a plastic object.

125. A method for marking an article, comprising applying to the article the composition of claim 1.

126. The method of claim 125 wherein the article is a container, paper, coating, ink, paint, wallpaper, fiber, film, a plastic object, wood, concrete, metal, ceramic or thermoplastic composite.

127. The method of claim 125 wherein the composition is applied to the article by conventional printing, digital printing, coating, spray-coating, dip coating or painting.

* * * * *